(12) United States Patent
Yamazaki

(10) Patent No.: US 8,913,276 B2
(45) Date of Patent: Dec. 16, 2014

(54) INFORMATION PROCESSING APPARATUS AND METHOD

(75) Inventor: Daisuke Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 13/569,598

(22) Filed: Aug. 8, 2012

(65) Prior Publication Data

US 2013/0057903 A1    Mar. 7, 2013

(30) Foreign Application Priority Data

Sep. 1, 2011    (JP) .................. 2011-191081

(51) Int. Cl.

| | | |
|---|---|---|
| *G06F 3/13* | (2006.01) | |
| *G06K 15/00* | (2006.01) | |
| *G06F 15/00* | (2006.01) | |
| *G06K 1/00* | (2006.01) | |
| *G06F 3/12* | (2006.01) | |
| *G06F 21/60* | (2013.01) | |
| *H04L 29/08* | (2006.01) | |

(52) U.S. Cl.
CPC ............ *G06F 3/1204* (2013.01); *G06F 3/1211* (2013.01); *G06F 3/1218* (2013.01); *G06F 3/1207* (2013.01); *G06F 3/1261* (2013.01); *G06F 3/1288* (2013.01); *G06F 3/1206* (2013.01); *G06F 3/1205* (2013.01); *G06F 3/1222* (2013.01); *G06F 3/1236* (2013.01); *G06F 3/1238* (2013.01); *G06F 3/126* (2013.01); *G06F 3/1287* (2013.01); *G06F 3/1292* (2013.01); *H04L 67/36* (2013.01); *H04L 67/02* (2013.01); *H04L 67/327* (2013.01); *G06F 21/608* (2013.01)
USPC .......... 358/1.15; 358/1.13; 358/1.14; 358/1.9

(58) Field of Classification Search
None
See application file for complete search history.

(56) References Cited

U.S. PATENT DOCUMENTS

| | | | | |
|---|---|---|---|---|
| 6,469,796 | B1 * | 10/2002 | Leiman et al. | ............... 358/1.15 |
| 8,111,422 | B2 * | 2/2012 | Furuya | ............................ 358/1.3 |
| 8,237,958 | B2 * | 8/2012 | Emori | ......................... 358/1.15 |
| 8,305,610 | B2 * | 11/2012 | Furuya | ......................... 358/1.15 |
| 8,559,033 | B2 * | 10/2013 | Kohli et al. | ................... 358/1.15 |
| 8,587,824 | B2 * | 11/2013 | Furuya | ............................ 358/1.3 |
| 2002/0113994 | A1 | 8/2002 | Smith et al. | |
| 2004/0218201 | A1 * | 11/2004 | Lermant et al. | ............... 358/1.13 |
| 2007/0216944 | A1 * | 9/2007 | Furuya | ......................... 358/1.15 |
| 2008/0068649 | A1 | 3/2008 | Emori | |

(Continued)

FOREIGN PATENT DOCUMENTS

| | | |
|---|---|---|
| JP | 2002-328843 A | 11/2002 |
| WO | 2011/090474 A | 7/2011 |

OTHER PUBLICATIONS

Bhatti, Nina, et al., "*Cloud-Based Printing for Mobile Devices*", Feb. 4, 2010, pp. 75400A-1 to 75400A-8, XP055048055.

*Primary Examiner* — Satwant Singh

(74) *Attorney, Agent, or Firm* — Fitzpatrick, Cella, Harper & Scinto

(57) ABSTRACT

In an information processing apparatus, information concerning the data format of a document designated by a terminal apparatus and a data format compatible with the image forming apparatus are received in accordance with an instruction from a user, and a connection route, of a plurality of connection routes to the image forming apparatus designated by the user and the terminal apparatus, which allows the image processing apparatus to process the document data is selected based on the received data format of the document and the data format compatible with the image forming apparatus. The terminal apparatus displays the selected connection route.

9 Claims, 16 Drawing Sheets

(56) References Cited

U.S. PATENT DOCUMENTS

2009/0273808 A1* 11/2009 Kohli et al. .................. 358/1.15
2012/0257245 A1* 10/2012 McCoog et al. ............. 358/1.15
2013/0120794 A1* 5/2013 Kamoi ........................ 358/1.15

* cited by examiner

FIG. 7A

DEVICE INFORMATION MANAGEMENT TABLE

| DEVICE ID | DEVICE TYPE | VIRTUAL PORT ID | MODEL | CORRESPONDING DATA FORMAT | CORRESPONDING CONNECTION SCHEME | POSITION INFORMATION | APPEARANCE INFORMATION |
|---|---|---|---|---|---|---|---|
| device0001 | MFP | VP0001 | C200 | PDL, PDF | Cloud, Wi-Fi Direct | ccc, ddd | xxxxxx ... |
| device0002 | MFP | VP0002 | C220 | PDL, PDF | Cloud, Wi-Fi Direct, Bluetooth | aaa, bbb | yyyyyy ... |
| device0003 | MFP | VP0003 | C100 | PDL | Cloud | eee, fff | zzzzzz ... |
| ... | | | | | | | ... |

FIG. 7B

USER INFORMATION MANAGEMENT TABLE

| ID | Password | DISPLAY NAME | OUTPUT AUTHORITY | AVAILABLE SERVICE |
|---|---|---|---|---|
| user0001 | ***** | userA | 2 | LOG MANAGEMENT SERVICE |
| user0002 | ****** | userB | 4 | - |
| user0003 | ****** | userC | 1 | - |
| ... | | | ... | ... |

FIG. 7C

OUTPUT ALLOWABLE RANGE (PLACE) INFORMATION OF user0001

| POSITION INFORMATION (CENTER) | RANGE (METER) |
|---|---|
| 35.75641.138.699477 | 500 |
| 34.23441.135.388723 | 100 |
| ... | ... |

FIG. 7D

STORAGE AREA AUTHENTICATION INFORMATION OF user0001

| STORAGE ID | Login ID | Password |
|---|---|---|
| storage0001 | username0324 | ***** |
| storage0004 | user0324 | ***** |
| ... | ... | ... |

FIG. 7E

DEVICE AUTHENTICATION INFORMATION OF user0001

| DEVICE ID | Login ID | Password |
|---|---|---|
| device0001 | a0324 | ***** |
| device_common | user0324 | ***** |
| ... | ... | ... |

FIG. 7F

DEFINITION INFORMATION OF OUTPUT AUTHORITY

| AUTHORITY IDENTIFICATION NUMBER | OUTPUT OPERATION INSIDE OUTPUT ALLOWABLE RANGE (PLACE) OF DOCUMENT WITHOUT OUTPUT RESTRICTION | OUTPUT OPERATION OUTSIDE OUTPUT ALLOWABLE RANGE (PLACE) OF DOCUMENT WITHOUT OUTPUT RESTRICTION | OUTPUT OPERATION INSIDE OUTPUT ALLOWABLE RANGE (PLACE) OF DOCUMENT WITH OUTPUT RESTRICTION | OUTPUT OPERATION OUTSIDE OUTPUT ALLOWABLE RANGE (PLACE) OF DOCUMENT WITH OUTPUT RESTRICTION |
|---|---|---|---|---|
| 1 | O | O | O | O |
| 2 | O | O | O | X |
| 3 | O | O | X | X |
| 4 | O | X | O | X |
| 5 | O | X | X | X |
| 6 | X | X | X | X |

FIG. 7G

MANAGEMENT INFORMATION OF LINKABLE STORAGE AREA

| STORAGE ID | STORAGE NAME | HOST VALUE | ROUTE URL |
|---|---|---|---|
| storage0001 | Strage Service A | strage-service-a.com | http(s)://www/strage-service-a.com |
| storage0002 | Strage Service B | strage-service-b.com | http(s)://www/strage-service-b.com |
| storage0003 | Strage Service C | strage-service-c.com | http(s)://www/strage-service-c.com |
| storage0004 | ... | ... | ... |

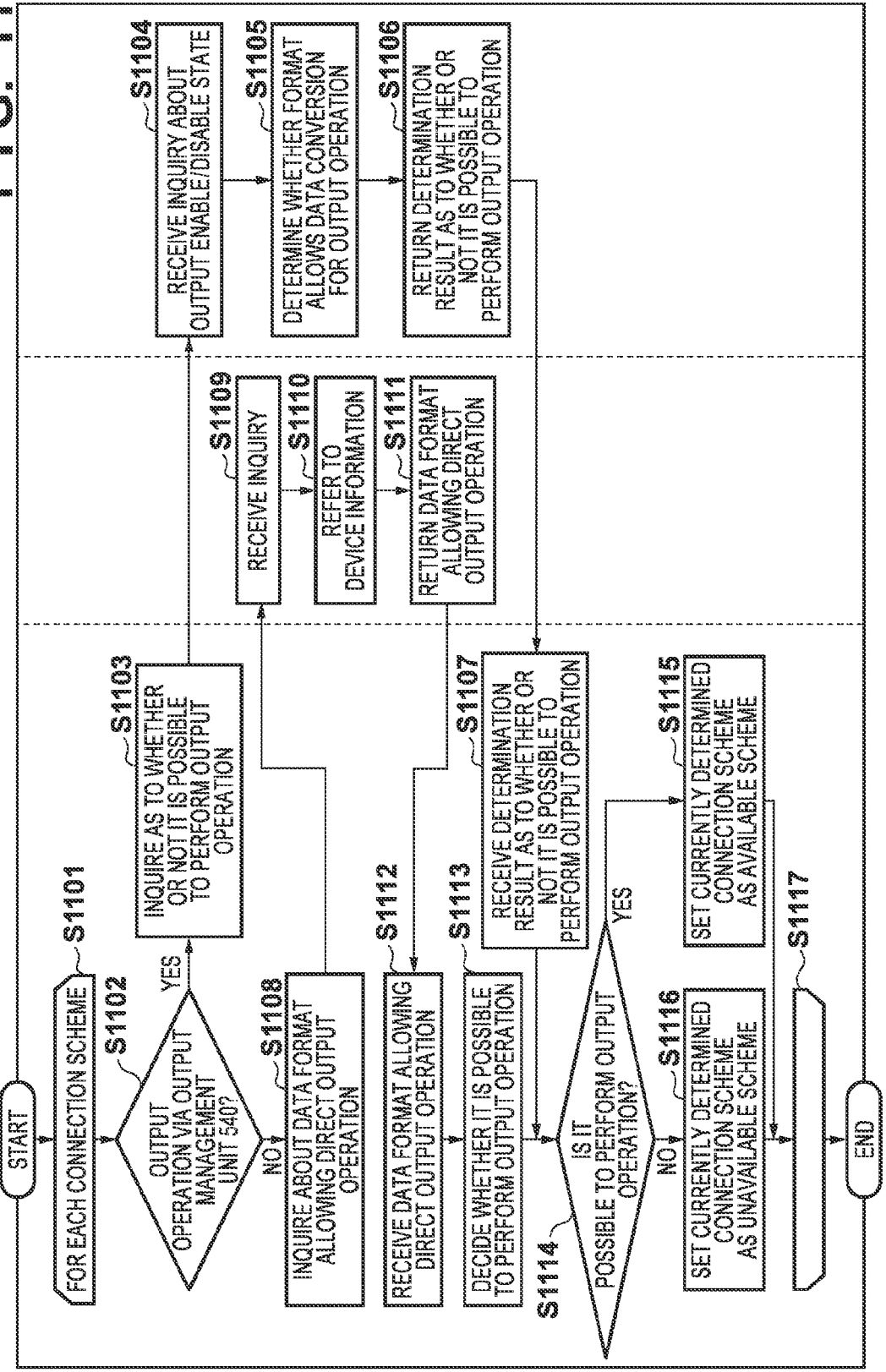

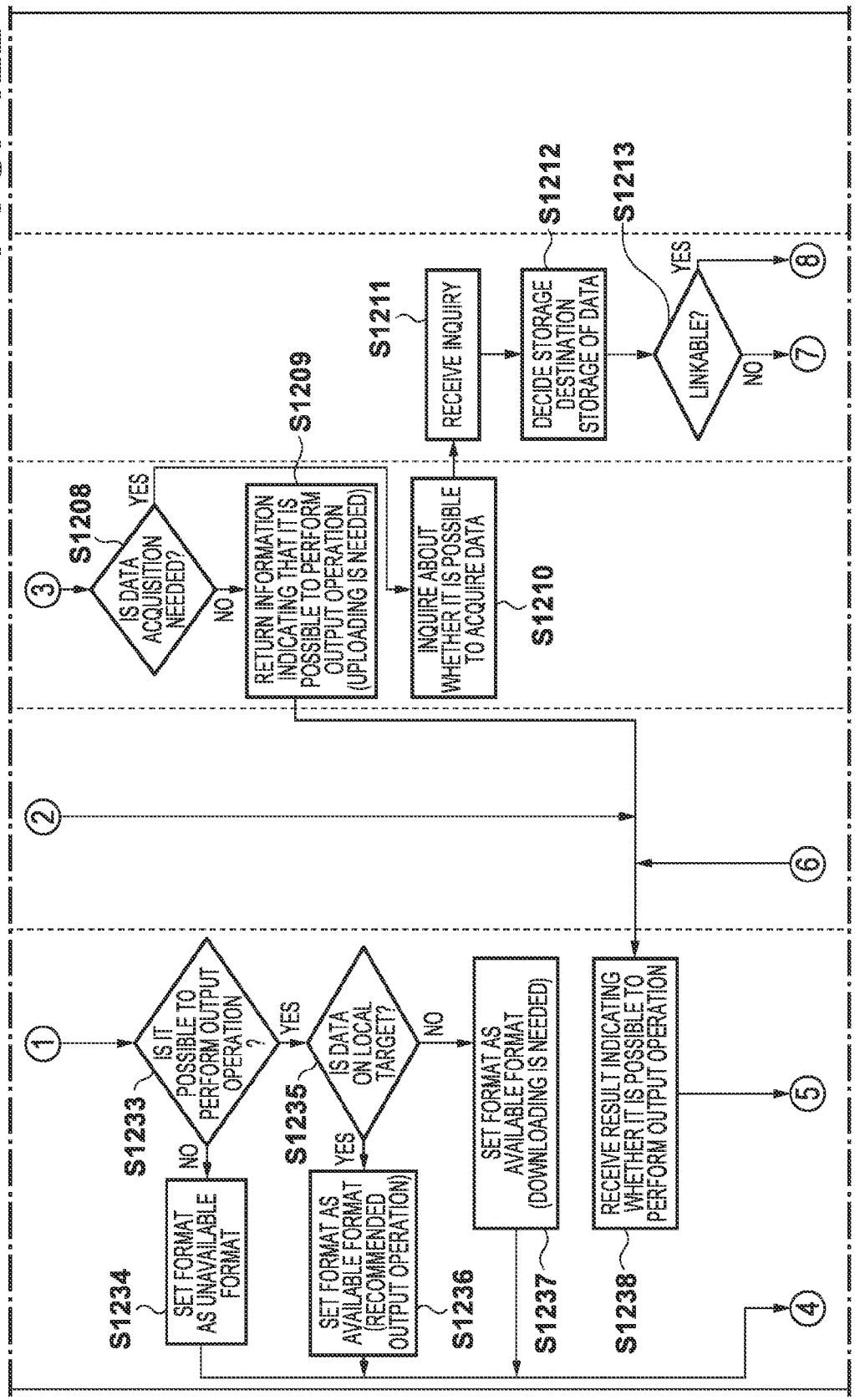

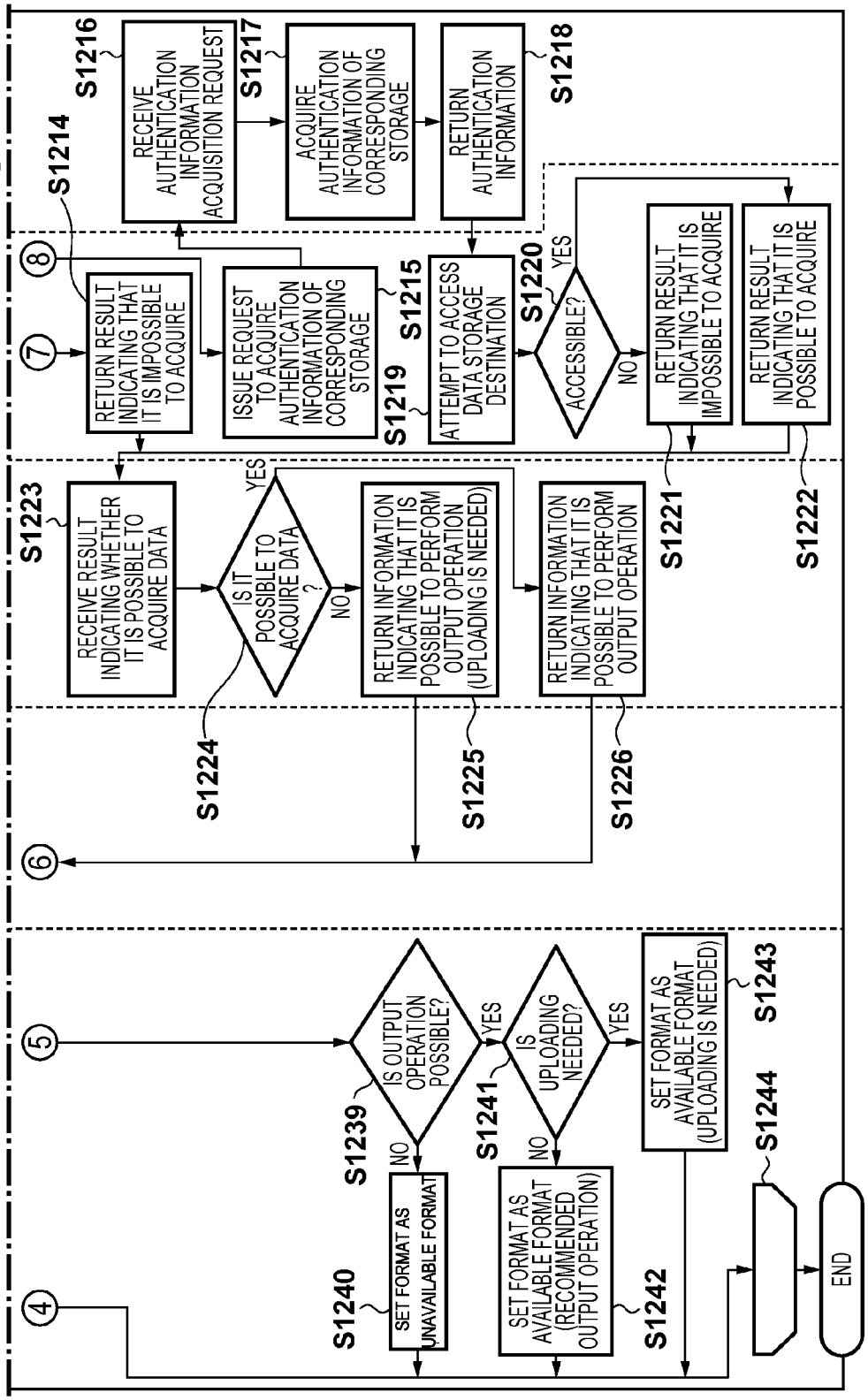

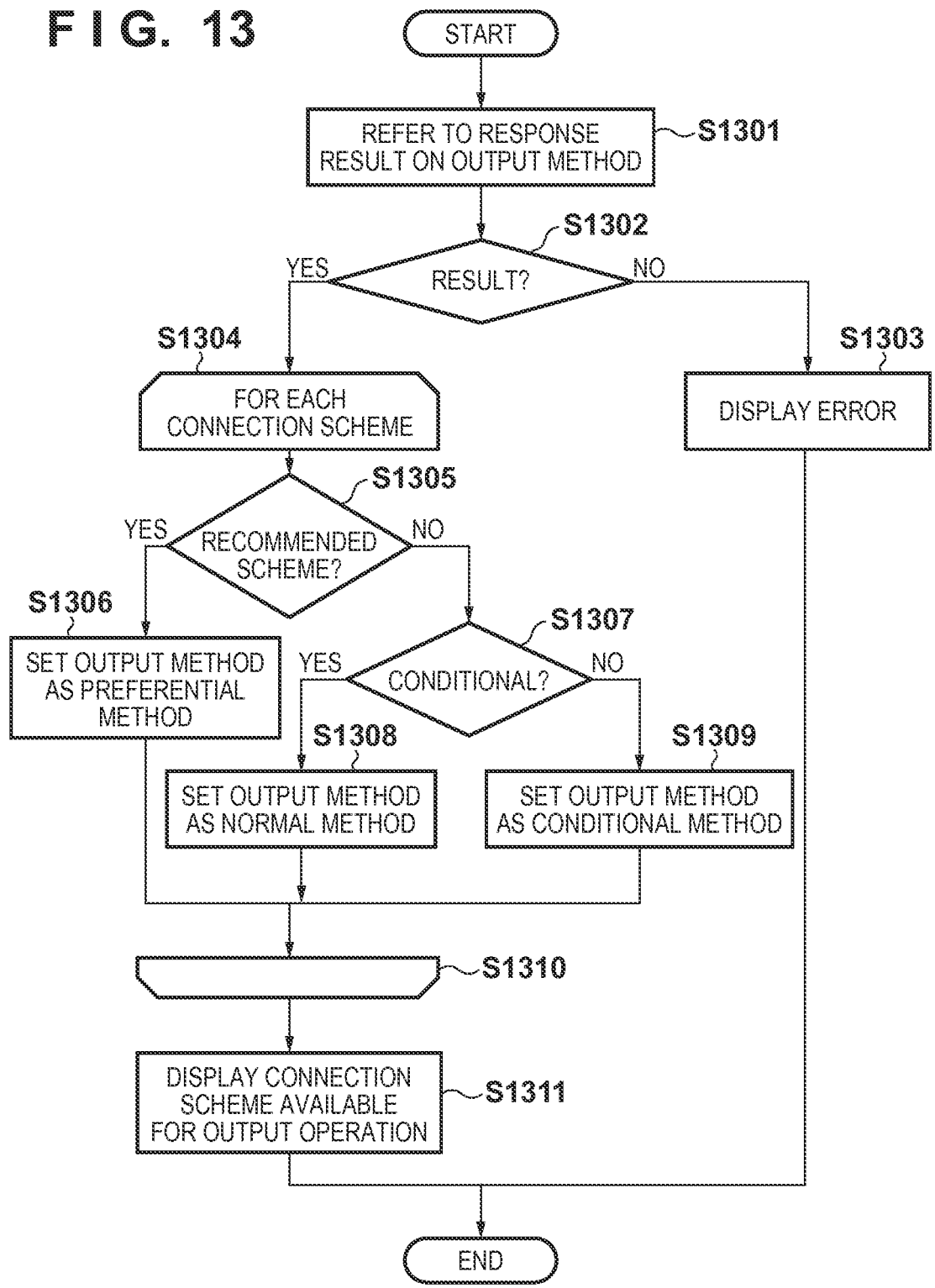

INFORMATION PROCESSING APPARATUS AND METHOD

BACKGROUND OF THE INVENTION

1. Field of the Invention

The present invention relates to an information processing apparatus which presents, when issuing an output request to an image forming apparatus, a connection method available for the output operation, and a method therefor.

2. Description of the Related Art

A great deal of attention has been paid to cloud computing systems which can use various kinds of applications operating on server computers on the Internet to reduce the management/maintenance costs for servers installed in offices and applications. Typical vendors are Google® and Microsoft®.

A great deal of attention has also been paid to mobile terminals typified by cellular phones loaded with iPhone® and Android OS®. As techniques of connecting devices to each other, wireless communication techniques such as Wi-Fi Direct® and techniques of establishing connection via the Internet are expected to become widespread in the future.

The proliferation of various kinds of services provided on mobile terminals and cloud computing systems may increase the opportunities of handling data in not only offices but also public environments outside the offices. Also, the usage of using a device upon occasional connection to it will likely increase in the future in addition to the conventional usage of installing software such as a printer driver in a device in advance to use the device.

The necessity of security management in document output operation will probably increase more than ever in a public environment as in a case in which, for example, in order to print a document on a mobile terminal, the mobile terminal is connected to a digital multifunctional apparatus in a convenience store which has not been used in the past. The details of the security management include providing output restrictions in accordance with the authorities of users and the contents of data.

As in the above related art, a document management system capable of registering, managing, and browsing documents stores in advance security information concerning output forms such as displaying, printing, transmitting, and storing for each document. There is available a technique of making a log-in user decide whether to output a document to an output apparatus, based on the security information of the document, when outputting the document (Japanese Patent Laid-Open No. 2002-328843).

The proliferation of services provided by such mobile terminals and cloud computing systems will increase the opportunities of handling data in public environments. This will also increase the chance of occasional connection to devices, as described above. This leads to the expectation of imposing restrictions on data output operations in consideration of security management.

In such an environment, restrictions may be imposed on the output operation of a device in use due to a combination of conditions dependent on output conditions (service place (public/private), user authority, security information, data format, the storage location of a subject document, and the like). In some cases, when printing a confidential document in, for example, a place outside an office, the user cannot print the document due to a restriction on output operations. In this case, the user may not know this in advance.

When occasionally connecting to an unknown device, there is a problem in that the user cannot know in advance by which connection scheme (for example, connection via the Internet or wireless communication connection) of various connection means he/she can use to perform a connection.

SUMMARY OF THE INVENTION

The present invention provides an apparatus and method which allow to easily select a connection scheme that enables printing even when performing output operation with respect to an unknown output device which has not been used in the past.

The present invention in a first aspect provides an information processing apparatus comprising: a reception unit configured to receive information concerning a data format of a document designated by a terminal apparatus and a data format compatible with an image forming apparatus in accordance with an instruction from a user; and a selection unit configured to select a connection route, from a plurality of connection routes between an image forming apparatus designated by the user and the terminal apparatus, that allows the image processing apparatus to process the document data, based on the data format of the document received by the reception unit and the data format compatible with the image forming apparatus, wherein the terminal apparatus is configured to display the connection route selected by the selection unit.

Further features of the present invention will become apparent from the following description of embodiments with reference to the attached drawings.

BRIEF DESCRIPTION OF THE DRAWINGS

FIGS. 7A to 7G are views showing various kinds of tables and information in the embodiment;

FIG. 11 is a flowchart showing the detailed processing in step S813 in the second embodiment;

FIGS. 12A to 12C are flowcharts showing the detailed processing in step S813 in the third embodiment;

FIG. 13 is a flowchart showing available connection scheme display processing.

DESCRIPTION OF THE EMBODIMENTS

The mode of carrying out the present invention will be described in detail below with reference to the accompanying drawings.

System Arrangement

Figure 1:
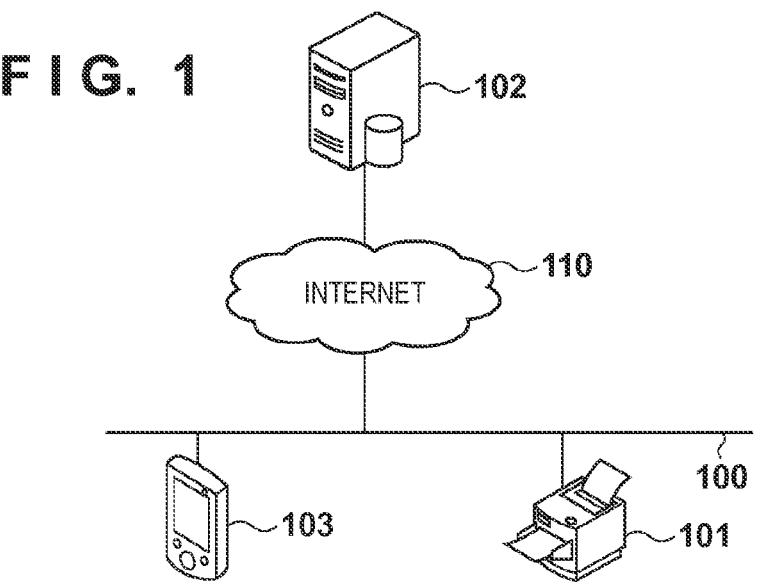
FIG. 1 is a view showing the arrangement of an output method presentation system according to an embodiment.

The arrangement of an output method presentation system according to an embodiment will be described with reference to FIG. 1. The arrangement of the output method presentation system shown in FIG. 1 is merely an example. An image forming apparatus 101 includes a mobile terminal 103. The image forming apparatus 101 can be connected to the mobile terminal 103 via a network 100. In addition, these components are connected to the Internet 110, and hence can be connected to each other via the Internet 110. The output method presentation system further includes an integrated management server 102. The integrated management server 102 is also connected to the Internet 110 and can communicate with the image forming apparatus 101 and the mobile terminal 103.

The Internet 110 is a communication network for exchanging information over firewalls between the respective apparatuses. The Internet 110 allows the image forming apparatus 101, the mobile terminal 103, and the integrated management server 102 to communicate with each other across firewalls. The Internet 110 is a communication network which supports, for example, the TCP/IP protocol regardless of whether wired or wireless is in use. FIG. 1 shows the integrated management server 102 as one server. However, this server may be constituted by a plurality of computers. Assume that in this case, a plurality of computers can communicate with each other via the Internet 110 without being blocked by firewalls.

Hardware Configuration

Figure 2:
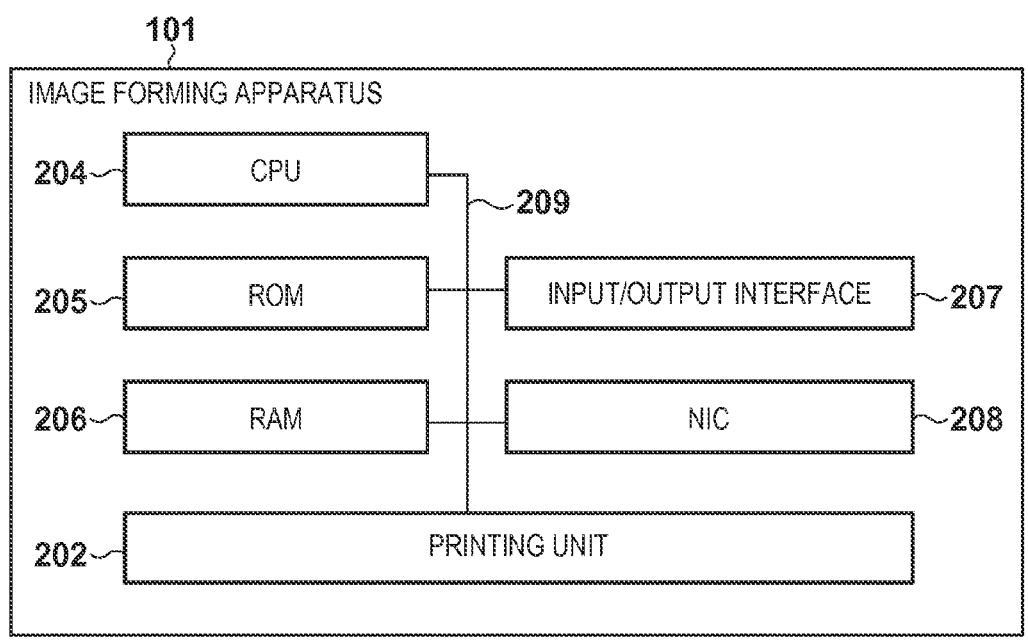
FIG. 2 is a block diagram showing an example of the hardware configuration of an image forming apparatus 101.

An example of the hardware configuration of the image forming apparatus 101 forming the output method presentation system will be described next with reference to FIG. 2. The image forming apparatus 101 includes a printing unit 202, a CPU 204, a ROM 205, a RAM 206, an input/output interface 207, a NIC (Network Interface Card) 208, and a bus 209. The image forming apparatus 101 outputs an image signal as output information to the printing unit (printer engine) 202 connected to the bus 209 based on the control program or the like stored in the program ROM in the ROM 205 under the control of the CPU 204. The ROM 205 stores the control program of the CPU 204, font data used to generate output information, information used on a host computer, and the like.

The CPU 204 is configured to be capable of performing communication processing with the mobile terminal 103 or the like via the input/output interface 207, and can communicate with the mobile terminal 103 in the image forming apparatus 101. The RAM 206 is a memory functioning as the main memory of the CPU 204, a work area when the CPU 204 executes processing, and the like.

Figure 3:
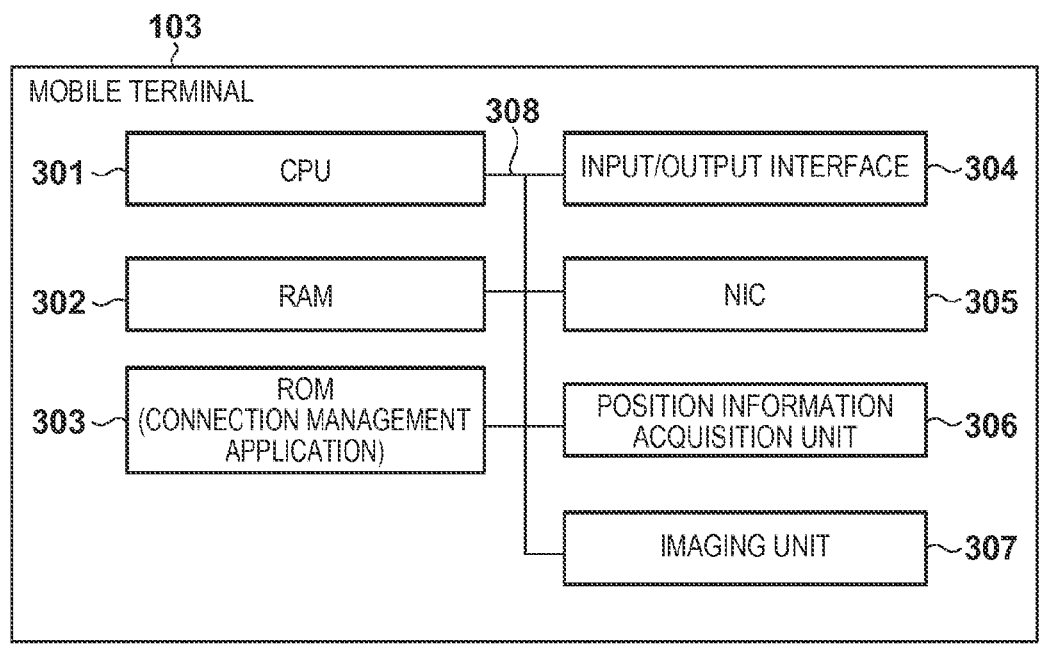
FIG. 3 is a block diagram showing an example of the hardware configuration of a mobile terminal 103.

An example of the hardware configuration of the mobile terminal 103 will be described next with reference to FIG. 3. The mobile terminal 103 includes a CPU 301, a RAM 302, a ROM 303, an input/output interface 304, a NIC 305, a position information acquisition unit 306, an imaging unit 307, and a bus 308.

The CPU 301 executes an OS (Operating System) and a general application program stored in the program ROM of the ROM 303, and comprehensively controls the respective devices connected to the bus 308. The ROM 303 stores an OS as a control program for the CPU 301 and various kinds of data. The RAM 302 functions as the main memory, work area, and the like of the CPU 301. The input/output interface 304 is equipped with a touch panel (not shown), and controls display operation, key input operation on the display, and the like.

Note that the touch panel has two functions, namely a display function and an input function, and displays image information and the like on the display. In addition, when the user touches a picture, point, or region displayed on the touch panel with his/her finger, the panel senses information at the touched window position and transmits corresponding information.

The NIC 305 is connected to a network, and executes communication control processing with another device connected to the network. The position information acquisition unit 306 acquires the current position by using a GPS (Global Positioning System). The imaging unit 307 captures an image by using a camera.

Figure 4:
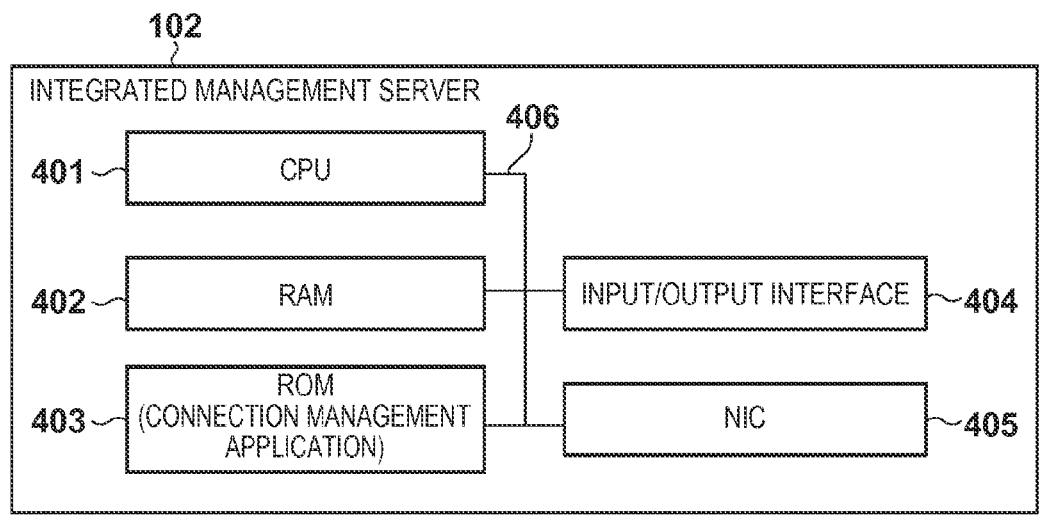
FIG. 4 is a block diagram showing an example of the hardware configuration of an integrated management server 102.

An example of the hardware configuration of the integrated management server 102 will be described next with reference to FIG. 4. The integrated management server 102 includes a CPU 401, a RAM 402, a ROM 403, an input/output interface 404, a NIC 405, and a bus 406. The function of each device is the same as that of a portable device 104, and hence a detailed description of each device will be omitted. Note that the integrated management server 102 may be implemented by an information processing apparatus such as a personal computer (PC).

Outline of Software Configuration

Figure 5:
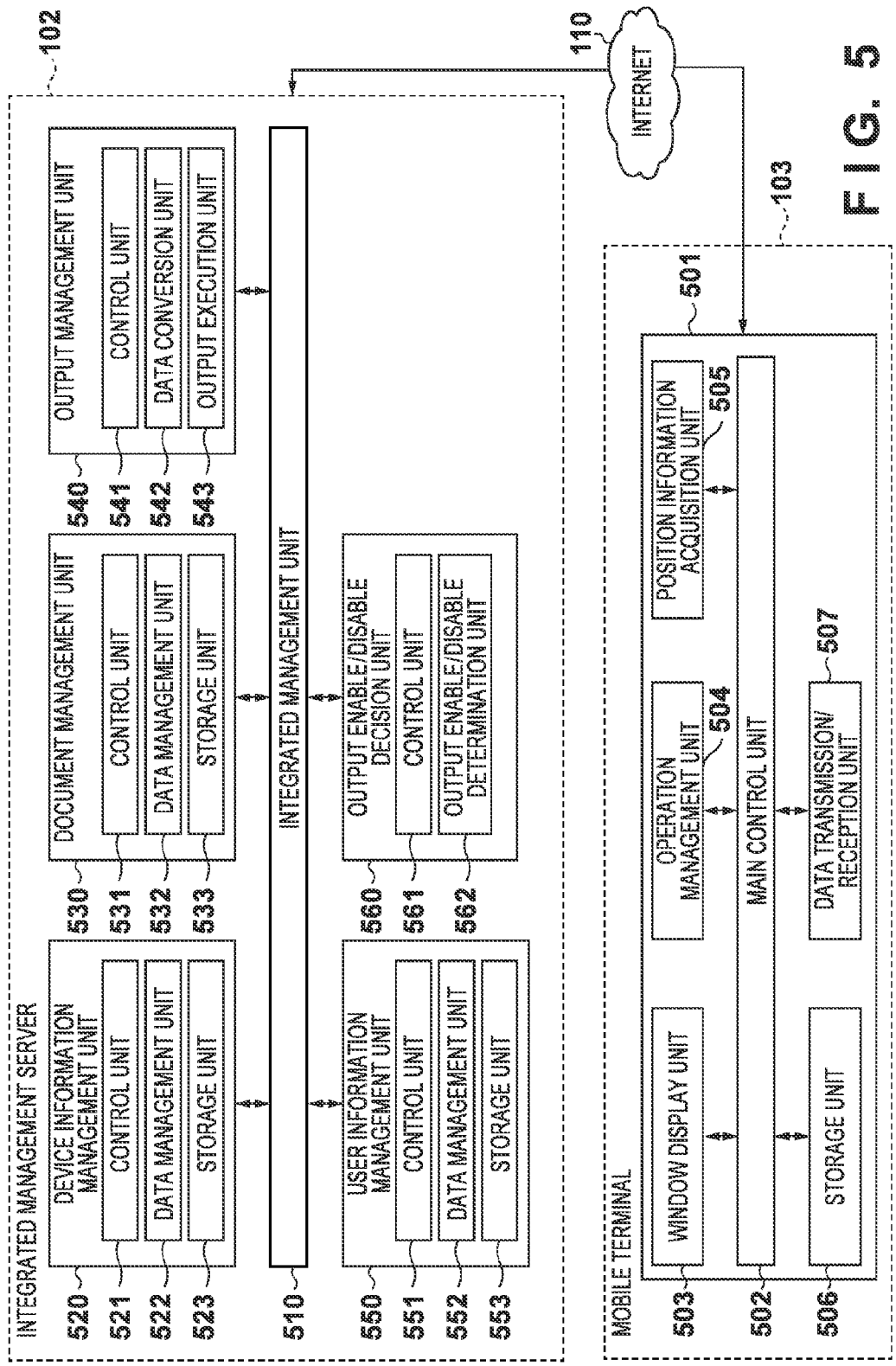
FIG. 5 is a block diagram showing the functional overviews of apparatuses constituting the output method presentation system.

An outline of the function of each apparatus constituting the output method presentation system will be described next with reference to FIG. 5. The software (program) implementing the function of each apparatus shown in FIG. 5 is stored in the ROMs 303 and 403 of the mobile terminal 103 and integrated management server 102. The CPUs 301 and 401 load the programs into the RAMs 302 and 402 and execute them, thereby implementing these functions.

Mobile Terminal

Document output software 501 which operates on the mobile terminal 103 will be described next. First of all, a main control unit 502 controls the document output software 501 in the mobile terminal 103 to instruct and manage the respective units (to be described later). A window display unit 503 displays the user interface of the document output software 501 of the mobile terminal 103 in accordance with an instruction from the main control unit 502. An example of the user interface of the document output software 501 will be described below with reference to FIG. 6. A mobile terminal window 600 of the touch panel allows displaying document data or the like and operating the document data or the like. This window arrangement will be further described in detail later. When the user operates the user interface of the document output software 501, the mobile terminal 103 performs mobile processing (to be described in detail later).

Figure 6:
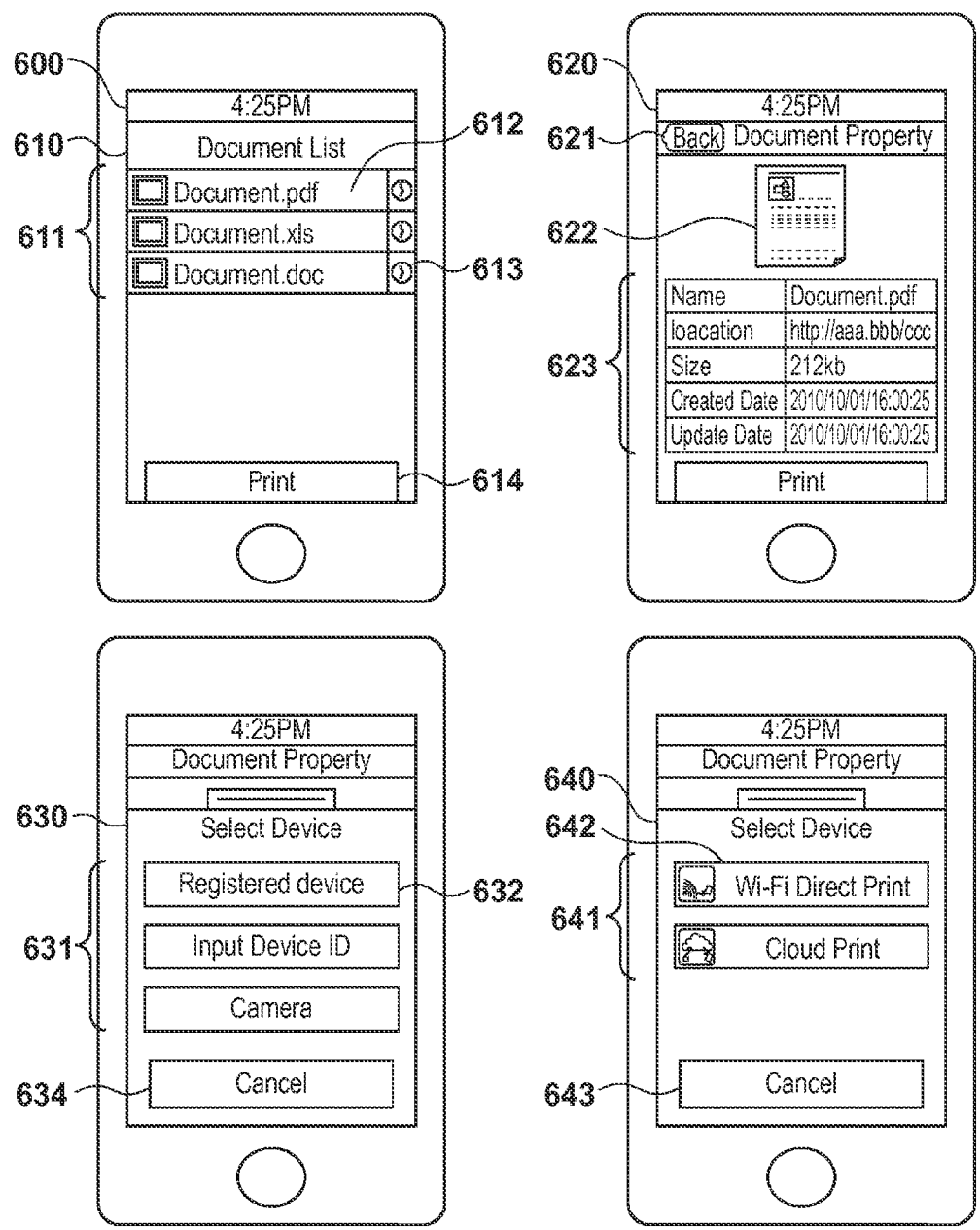
FIG. 6 is a view showing an example of the user interface of document output software 501.

Note that the user interface of the document output software 501 shown in FIG. 6 is not limited to any specific form in terms of display items and control, and may have any form as long as it can implement necessary functions.

Referring back to FIG. 5, an operation management unit 504 acquires information inputted by the user via the user interface of the document output software 501 displayed by the window display unit 503, and notifies the main control unit 502 of the corresponding information. When the user touches a display item or display region displayed on the mobile terminal window 600 with his/her finger, the mobile terminal window 600 senses information at the window position touched by the user and transmits the information to the main control unit 502. A storage unit 506 stores the setting information set by the user via the user interface of the document output software 501 and data such as a document. A data transmission/reception 507 transmits and receives data to and from the integrated management server 102 and the image forming apparatus 101, and notifies the main control unit 502 of the corresponding information.

Integrated Management Server

The software configuration of the integrated management server 102 will be described next. As shown in FIG. 5, the software of the integrated management server 102 includes an integrated management unit 510, a device information management unit 520, a document management unit 530, an output management unit 540, a user information management unit 550, and an output enable/disable decision unit 560. The integrated management unit 510 instructs and manages the respective units (to be described later) by linking to the respective units of the integrated management server 102. The integrated management unit 510 also transmits and receives data to and from external apparatuses via the Internet 110.

The device information management unit 520 manages the device information of the image forming apparatus 101. FIG. 7A shows an example of device information to be managed. The device information management unit 520 has a function of setting and acquiring various types of device information matching the pieces of identification information of devices in accordance with requests from the apparatuses connected via the integrated management unit 510 or the Internet 110. As shown in FIG. 5, the device information management unit 520 includes a control unit 521, a data management unit 522, and a storage unit 523. The control unit 521 instructs and manages the data management unit 522 and the storage unit 523. The control unit 521 is also in charge of transmission/reception of instructions and data to/from the integrated management unit 510 and data transmission/reception via the Internet 110. The data management unit 522 has a function of managing device information by receiving a request to acquire or register device information and issuing corresponding instructions to the storage unit 523. The storage unit 523 stores device information.

The document management unit 530 has a function of storing document data in the document management unit 530. The document management unit 530 has a document management function of registering and acquiring document data in accordance with requests from apparatuses connected via the integrated management unit 510 or the Internet 110. The document management unit 530 also provides a function of acquiring data from document data stored in an external document storage area (not shown) and registering document data in the external document storage area by linking to the external document storage area. Specific examples of services using external document storage areas assumed in this case include storage services using Google Docs of Google® and SharePoint Online of Microsoft®.

It is possible to implement linkage with this external document storage area by making the integrated management server 102 incorporate an interface for performing information acquisition processing for document data stored in advance in the external document storage area and document registration processing with respect to the document storage area. In addition, linkage with an external document storage area can be implemented under the condition that an interface for the linkage is implemented, regardless of the type of provider or document storage area. The document management unit 530 includes a control unit 531, a data management unit 532, and a storage unit 533. The control unit 531 instructs and manages the data management unit 532 and the storage unit 533. The control unit 531 is also in charge of transmission/reception of instructions and data to/from the integrated management unit 510 and data transmission/reception via the Internet 110. The data management unit 532 has a function of managing document information by receiving a request to acquire or register document data or device information and issuing corresponding instructions to the storage unit 533. A linkage interface with the above external document storage area is implemented by the data management unit 532 and performs transmission/reception of document information to/from the external document storage area. The storage unit 533 stores document data or document information which indicates the document storage area provided by the document management unit 530.

The output management unit 540 has a function of issuing an instruction to the image forming apparatus 101 and outputting document data to the image forming apparatus 101. The output management unit 540 transmits designated document data in different types of formats, in accordance with requests from an apparatus connected via the integrated management unit 510 or the Internet 110, upon converting the data into output data which can be interpreted by the image forming apparatus. Output data which can be interpreted by the image forming apparatus generally indicates data which is obtained by expanding data received by the image forming apparatus and can be output as an image. More specifically, such data corresponds to PDL (Page Description Language) or PDF (Portable Document Format) data. The output management unit 540 includes a control unit 541, a data conversion unit 542, and an output execution unit 543. The control unit 541 instructs and manages the data conversion unit 542 and the output execution unit 543. The control unit 541 is also in charge of transmission/reception of instructions and data to/from the integrated management unit 510 and transmission/reception of instructions and output data to/from the image forming apparatus 101 via the Internet 110. The data conversion unit 542 has a function of converting document data to be output into data in a format such as PDL which can be interpreted by the image forming apparatus 101. The output execution unit 543 issues an output instruction to the image forming apparatus 101 and transmits output data in accordance with instructions from apparatuses connected via the integrated management unit 510 or the Internet 110.

The user information management unit 550 has a function of managing individual information of the user who uses the function provided by the integrated management server 102. FIG. 7B shows an example of user information to be handled. The user information management unit 550 manages various kinds of authentication information necessary to access the image forming apparatus 101 and an external document storage area when the output management unit 540 performs document output operation and the document management unit 530 performs document operation. In addition, the user information management unit 550 provides authentication information in accordance with a request from an apparatus connected via the integrated management unit 510 or the Internet 110. The user information management unit 550 also manages functions which can be used by the user, which are specified by the identification information of the user, and the authority information at the time of use of the functions, and returns an available function or authority information in response to a request (inquiry) from an apparatus connected via the integrated management unit 510 or the Internet 110. This implements the distribution of functions to be provided to the respective users. The user information management unit 550 includes a control unit 551, a data management unit 552, and a storage unit 553. The control unit 551 instructs and manages the data management unit 552 and the storage unit 553. The control unit 551 is also in charge of transmission/reception of instructions and data to/from the integrated management unit 510 and data transmission/reception via the Internet 110. The data management unit 552 has a function of managing user information by receiving a request to acquire or register user information and issuing a corresponding instruction to the storage unit 553. The storage unit 553 stores user information.

The output enable/disable decision unit 560 has a function of deciding an output enable/disable state (i.e., a state indicative of whether or not it is possible to perform an output operation), in response to an inquiry as to whether or not it is possible to perform an output operation with respect to the integrated management server 102. With regard to an image forming apparatus designated at the time of inquiry, the output enable/disable decision unit 560 selects a connection scheme available for output operation in cooperation with the device information management unit 520, decides whether or not it is possible to perform an output operation via the output management unit 540 in cooperation with the user information management unit 550 and the output management unit 540, and returns corresponding information. The output enable/disable decision unit 560 includes a control unit 561 and an output enable/disable determination unit 562. The control unit 561 instructs and manages the output enable/disable determination unit 562. The control unit 561 is also in charge of transmission/reception of instructions and data to/from the integrated management unit 510 and data transmission/reception via the Internet 110. The output enable/disable determination unit 562 is in charge of output enable/disable decision processing for deciding whether or not it is possible to perform an output operation.

In this case, the device information management unit 520, the document management unit 530, the output management unit 540, the user information management unit 550, and the output enable/disable decision unit 560 are configured to be implemented on the hardware of the integrated management server 102. However, the respective units may be implemented on one or a plurality of devices (equivalent to the hardware configuration shown in FIG. 4) to separately provide the corresponding functions.

Software Window Example (Mobile Terminal)

FIG. 6 shows a window example of the document output software 501 operating on the mobile terminal 103. The mobile terminal window 600 is displayed on the touch panel (not shown) of the input/output interface 304. When the user touches a control displayed on the mobile terminal window 600 with his/her finger, the mobile terminal 103 receives an input operation from the user via the mobile terminal window 600. The following will exemplify a document list display window 610, a document property display window 620, a device designation window 630, and an available output method display window 640 as operation windows at the time of output operation on the mobile terminal 103.

The document list display window 610 contains a document list 611 including a document name 612 of document data. The mobile terminal 103 receives a selection operation on the document name 612 in the document list display window 610 and allows selection of a document to be processed. When the user taps a document property button 613, the details of the designated document 612 is displayed on the document property display window 620. A print button 614 is a button for executing output operation. When the user selects the document 612 and taps the print button 614, the mobile terminal initiates to the print processing of the selected document 612.

The document property display window 620 is a window in which the detailed information of one document is displayed. The document property display window 620 includes a document thumbnail 622 expressing document data as a reduced image and a document property list 623 displaying attribute information such as the storage location, size, and creation date and time of the document.

The device designation window 630 is a window for designating an image forming apparatus to output. When the user taps the print button 614 on the document list display window 610 or the document property display window 620, the mobile terminal displays this window. The device designation window 630 includes a device designation list 631 of device designation buttons 632 indicating device designation methods. For example, upon selecting "Registered device" as one of the device designation buttons 632, the user designates a desired image forming apparatus from the image forming apparatuses registered in advance on a window for selecting a device (not shown). Upon selecting "Input Device ID" as one of the device designation buttons 632, the user designates an image forming apparatus by inputting address information or identification information for specifying an image forming apparatus in the form of a text on a window for inputting address/ID information (not shown). There is conceivable a device designation method of identifying an image forming apparatus by imaging, for example, an identification code embedded with address information or identification information or the appearance information of an image forming apparatus using the imaging unit 307. It is possible to use any means which can designate the identification information or address information of an image forming apparatus. When the user designates an image forming apparatus by operation on the device designation window 630, the mobile terminal inquires the integrated management server 102 about an available connection scheme for the designated image forming apparatus.

The available output method display window 640 includes connection schemes available for output operation by a designated image forming apparatus. The available output method display window 640 contains an available output method list 641 including output buttons 642 which are to be tapped to designate connection schemes to be used for output operation. When the user taps an output button 642, the mobile terminal outputs the designated document to the selected image forming apparatus using a connection scheme corresponding to the tapped output button. For example, the available output method display window 640 in FIG. 6 includes two connection schemes, namely a cloud-based connection scheme and a connection scheme using Wi-Fi, which are obtained as a response to an inquiry about a connection scheme for the designated image forming apparatus.

Table Example

The table structure of each type of management information handled by the integrated management server 102 will be described with reference to FIGS. 7A to 7G. FIG. 7A shows a device information management table, which is an example of a table for the management of device information of each image forming apparatus. The device information management table includes device IDs for identifying devices and information indicating the types and models of devices. This table also includes virtual port identification information for identifying each virtual port to be used for an output operation via the Internet 110, position information representing the position of each device, and appearance information indicating an image or the like representing the appearance of each device. The table also includes a data format which allows each device to directly output and a connection scheme available for connection when each device outputs. The device information management table is stored and managed by the device information management unit 520 of the integrated management server 102.

FIG. 7B shows a user information management table, which is an example of a table for the management of information concerning users who use the functions of the integrated management server 102. The user information management table includes user IDs for identifying users on the integrated management server 102, passwords for logging in to the integrated management server 102, and user names for display. This table manages information concerning the output authorities of users and functions which are provided as added values by the integrated management server and can be used by users. The information concerning the output authorities of users is indicated by IDs of the output authorities defined in definition information as shown in FIG. 7F. The table, shown in FIG. 7C, also includes output allowable ranges (places) which define geometric ranges, in which users can perform an output operation as shown in for example, by providing restrictions on output operations outside the office. The user information management table further manages authentication information (FIGS. 7D and 7E) necessary for accessing external storage areas and/or image forming apparatuses. These pieces of information (i.e., information shown in FIGS. 7C and 7D) are linked to respective user IDs of the user information management table and stored. The user information management table is stored and managed by the user information management unit 550 of the integrated management server 102.

FIG. 7F shows an example of a definition of each output authority. In this embodiment, each output authority managed as user information described above is defined in this definition, and a decision is made as to whether or not it is possible to perform an output operation for each user based on this definition. In this case, a criterion for deciding whether or not it is possible to perform an output operation is defined by the presence/absence of an output restriction on data and a restriction on an output place. The output authorities are managed by authority identification numbers.

FIG. 7G shows an example of a table for the management of information concerning linkable external storage areas. This table manages external storage areas for which linkage interfaces are implemented in the integrated management server 102. The table manages IDs for identifying external storage areas, host values to be used for discriminating storage destinations from the URLs of documents, and information like route URLs. The information recorded in each table will be further described later with reference to respective processing procedures.

Output Method Presentation Processing

An outline of the processing of making the integrated management server 102 return available connection methods in response to a request from the mobile terminal 103 and making the mobile terminal 103 present the methods will be described next with reference to the flowchart shown in FIG. 8. Detailed processing will be described, as needed, with reference to other drawings. Note that the CPU 301 of the mobile terminal implements each step of the flowchart concerning the mobile terminal in the present application by reading out and executing program code associated with steps of the flowchart that concern the mobile terminal. On the other hand, the CPU 401 of the integrated management server 102 implements each step of the flowchart concerning the integrated management server 102 in the present application by reading out and executing program code associated with the steps of the flowchart concerning the integrated management server.

The document output software 501 operating on the mobile terminal 103 receives a document output request in response to an instruction from the user. After the mobile terminal 103 receives the designation of a document from the document list 611 and a tap of the print button 614 on the window 600 in FIG. 6 displayed in response to the output request, the mobile terminal displays the device designation window 630. When the user designates a device by operation via the device designation window 630, the processing in FIG. 8 starts. Assume that in the present application, the user has selected "Camera" as one of the device designation buttons 632 on the device designation window 630 in FIG. 6.

The operation management unit 504 of the mobile terminal 103 which has received the operation from the user notifies the main control unit 502 of the reception of the designation of a device. The main control unit 502 transmits, to the integrated management server 102, a request to acquire an output method available in the image forming apparatus designated by the user together with the document information of the document designated from the document list display window 610 in FIG. 6 (step S801), the user identification information of the current user and the position information of the mobile terminal. Document information transmitted in this case indicates document identification information for identifying a document, such as an URI (Uniform Resource Identifier) and attribute information attached to the document. Assume that document attribute information includes the output restriction information of a document. If a document has an output restriction, an output operation is restricted depending on the authority of the user and the output restriction information of the document. User identification information indicates user identification information needed to use the function provided by the integrated management server 102. The integrated management server 102 manages the individual information of each user based on this user identification information. In addition, position information, acquired by a position information acquisition unit 505 via the position information acquisition unit 306, indicates the position information of the mobile terminal 103 which is designated by an image forming apparatus on the device designation window 630 in FIG. 6. According to the present application, the user has selected "Camera" as the device designation button 632, and hence the mobile terminal transmits, to the integrated management server 102, not only the picture (appearance information) of the image forming apparatus which has been captured by the user using the mobile terminal but also the above document information. In the present embodiment, information transmitted when a request to acquire an output method is issued is referred to as request information. That is, request information includes document information, user identification information, position information, and appearance information.

Upon receiving a request from the mobile terminal 103, the integrated management server 102 causes the output enable/disable decision unit 560 to receive the request via the integrated management unit 510 in step S802. Upon receiving the request, the output enable/disable decision unit 560 refers to the request information received together with the request (step S803). In step S804, the output management unit 540 transmits the request to acquire a connection scheme for an image forming apparatus as request information to the device information management unit 520.

Upon receiving the request in step S805, the device information management unit 520 specifies the identification information of the image forming apparatus designated by the user in step S806. More specifically, the device information management unit 520 searches for identification information (device ID) of the image forming apparatus (the image forming apparatus imaged by the user) designated by the user based on the position information and appearance information included in the request information and the device information management table (FIG. 7A). In the processing in step S807, the connection scheme corresponding to the found device ID is transmitted to the output enable/disable decision unit 560. If, for example, "ccc" and "xxxxxx . . . " are respectively transmitted as the position information and appearance information included in the request information, "device0001" is specified as a device ID, and "Cloud" and "Wi-Fi Direct" are specified as corresponding connection schemes. These pieces of information "Cloud" and "Wi-Fi Direction" are transmitted in step S807. If there is no matching device information, information indicating that no information could be acquired is transmitted. If, for example, "ccc" and "yyyyyy . . . " are respectively transmitted as the position information and appearance information included in the request information, since there is no device ID matching these pieces of information, information indicating that no information could be acquired is transmitted.

Upon receiving a response from the device information management unit 520 (step S808), the output enable/disable decision unit 560 decides in step S809 whether a connection scheme has been normally acquired. If no connection scheme could be acquired due to the absence of matching information, information indicating the failure is transmitted as a result to the mobile terminal 103 via the integrated management unit 510 in step S810.

At step 811, the mobile terminal 103 receives the response from the integrated management server 102 via the main control unit 502. In step S812, the main control unit 502 of the mobile terminal 103 issues an instruction to the window display unit 503 to display information indicating the result is an error.

However, if it is determined in step 809 that a connection scheme has been normally acquired, the output enable/disable decision unit 560 executes processing to make a decision as to whether or not it is possible to perform an output operation with respect to the acquired connection scheme in step S813. The details of step S813 will be described with reference to other drawings.

In step S814, the output enable/disable decision unit 560 transmits the decision to the mobile terminal 103 via the integrated management unit 510. With this operation, the mobile terminal 103 receives a response from the integrated management server 102 (step S815) via the main control unit 502. In step S816, the main control unit 502 issues an instruction to the window display unit 503 to display the result. Output method display processing performed by the mobile terminal 103 in steps S812 and S816 will be described with reference to FIG. 10.

Output Enable/Disable Processing (Security Management) for Each Connection Scheme The details of the processing in step S813 of FIG. 8 will be described with reference to the flowchart shown in FIG. 9. This is an embodiment of the processing of selecting a connection scheme, from the connection schemes available for connection to the image forming apparatus 101 designated by the user, which is available for output operation under the current conditions. More specifically, the output enable/disable determination unit 560 determines whether or not it is possible to perform an output operation depending on an output restriction on document data, the authority of the user, and an output place. For example, in some cases, it may be possible to perform an output operation via the output management unit 540 of the integrated management server 102, and it may be impossible to perform an output operation (direct output operation by wireless communication) without the output management unit 540. Even if the user is not permitted to perform an output operation outside an allowed place due to authority restriction, the output operation may be permitted when the integrated management server 102 monitors and manages output operation by the user. More specifically, the integrated management server 102 may manage user information, and manage a log of output operations by the user. In this case, managing the user information and logging output operations serves as an audit function, and thus output operations by users are managed. This produces a deterrent effect in terms of security. When a user performs an output operation using the function provided by the integrated management server in this manner, output conditions may change. The processing shown in FIG. 9 will be described below assuming that the additional function provided by the integrated management server 102 is a log management function.

Figure 8:
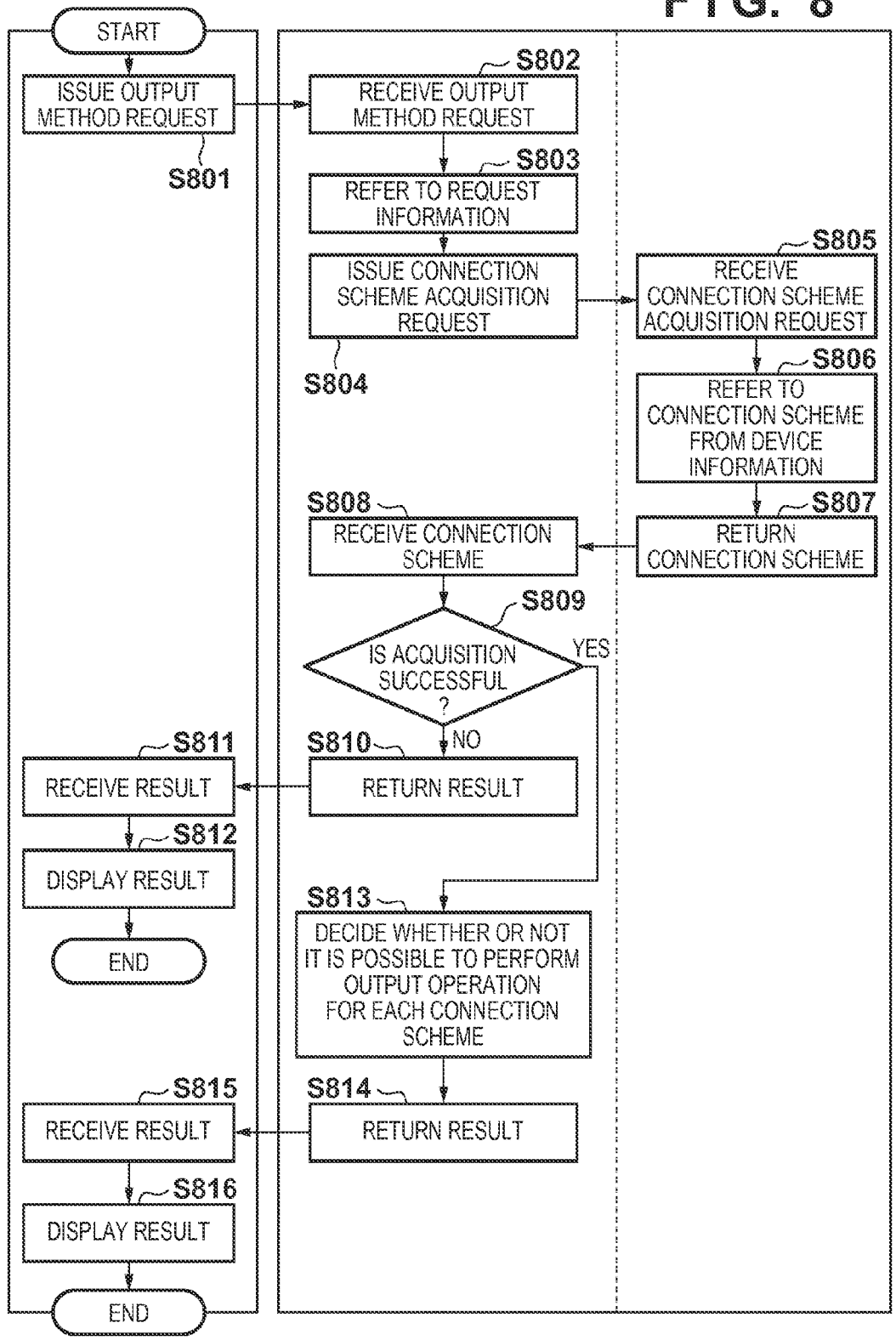
FIG. 8 is a flowchart showing an outline of output method presentation processing.
Figure 9:
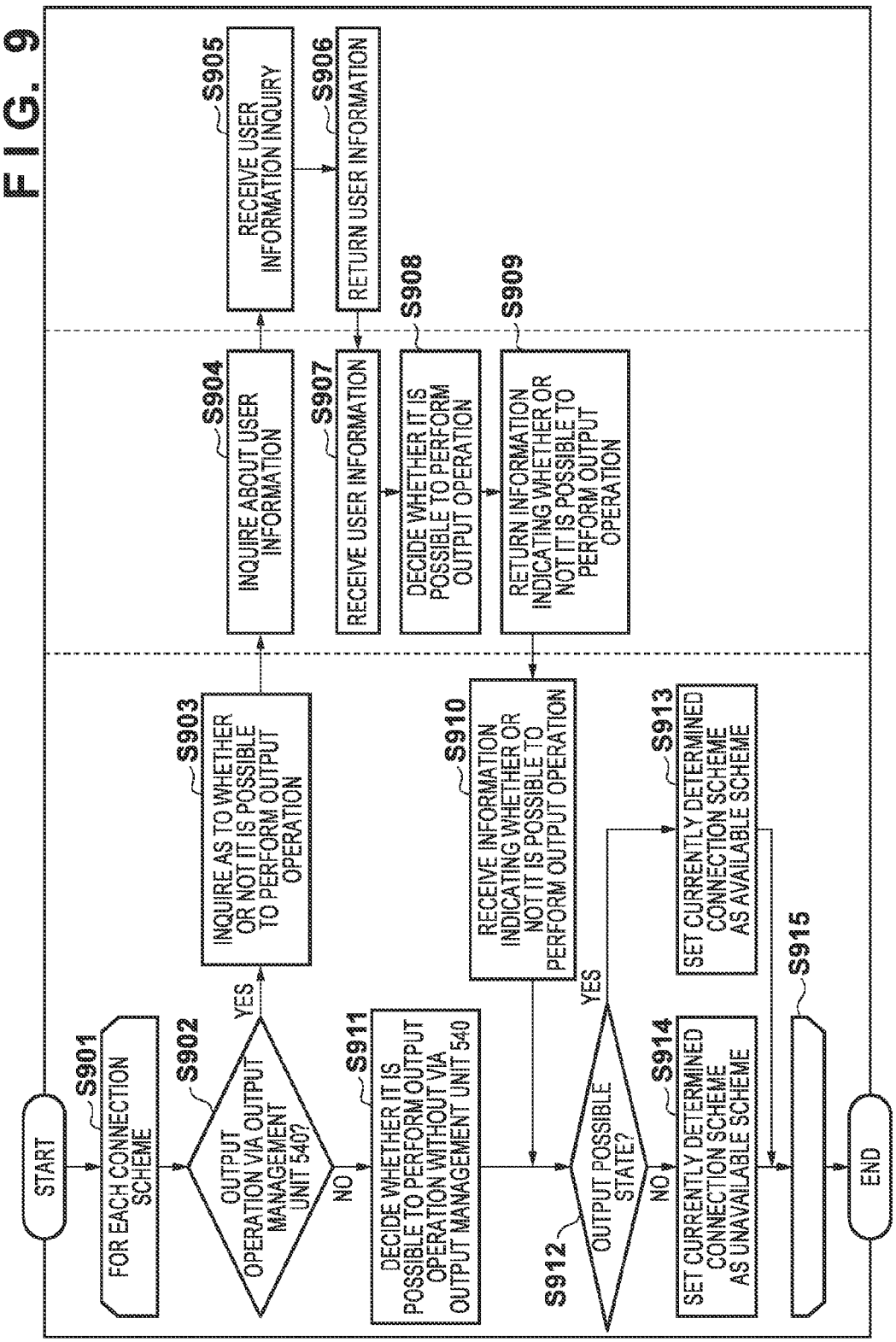
FIG. 9 is a flowchart showing the detailed processing in step S813.

Upon receiving a response from the device information management unit 520 in step S808 in FIG. 8, the output enable/disable decision unit 560 executes the processing in steps S901 to S915 for each received connection scheme. First of all, the output enable/disable decision unit 560 decides whether the connection scheme currently determined in step S902 uses a connection via the output management unit 540 of the integrated management server 102. More specifically, connection schemes are managed by being mapped to identifiers (not shown), and the types of connection schemes are determined by their identifiers. If the connection scheme currently determined in step S902 uses a connection via the output management unit 540, the process moves on to step S903 to inquire the output management unit 540 as to whether or not it is possible to perform an output operation. In this case, the identification information of the user, the attribute information (document information) of the document, and the position information which are received in step S802 in FIG. 8 are transmitted to the output management unit 540.

Upon receiving this inquiry, the output management unit 540 transmits a request to acquire user information matching the identification information of the user to the user information management unit 550 in step S904. Upon receiving the request from the output management unit 540 in step S905, the user information management unit 550 refers to user information matching the designated identification information of the user from the management information of the user information management unit 550. More specifically, the user information management unit 550 searches for information matching user "ID" in FIG. 7B. In step S906, the user information management unit 550 returns the user information referred to in step S905 to the output management unit 540.

This makes the output management unit 540, which has received the user information in step S907, determine in step S908 whether it is possible to perform an output operation via the output management unit 540. The determination made in this case will be described with reference to a specific example. The output management unit 540 refers to the available additional function, of the received user information, which is provided by the integrated management server 102 ("useable service" shown in FIG. 7B). Assume that in this case, the user corresponding to the user ID "user0001" can use "log management service". This is the log management function provided by the output management unit 540 in addition to the basic functions. This function allows management of output operations performed by the user in a log. Assume that when this log management function is ON, output operation is enabled, whereas when the function is OFF, output operation is disabled. In this case, it is possible to determine, from the ON/OFF state of the additional function, whether output operation via the output management unit 540 is allowed. Assume that in this case, the output management unit 540 determines, from the presence/absence of the log management function in the processing in step S908, whether output operation via the output management unit 540 is allowed. The output management unit 540 then returns the determination result on an output enable/disable state in step S908 to the output enable/disable decision unit 560 in step S909.

In addition, if the output enable/disable decision unit 560 decides that the connection scheme currently determined in step S902 does not use a connection via the output management unit 540, the process moves on to step S911, in which the output enable/disable decision unit 560 decides whether an output operation is possible. In this case, the output enable/disable decision unit 560 decides whether an output operation is possible from the identification information of the user, the attribute information of the document, and the position information. More specifically, it is possible to decide whether output operation is possible from the output authority of user information ("output authority" shown in FIG. 7B and FIG. 7F) and the attribute information of the document and position information received in step S802 in FIG. 8. For example, the output enable/disable decision unit 560 decides that the document which corresponds to the ID "user0001" in FIG. 7B and on which output restriction is imposed can be output if it is output at a position within the range included in FIG. 7C. It decides that the document cannot be output if it is to be output at a position outside the range.

Upon receiving the determination result of the determination made in step S910 or in step S911, the output enable/disable decision unit 560 advances the processing to step S913 to set the currently determined connection scheme as an available connection scheme if the output enable/disable decision unit 560 decides in step S912 that output operation is possible. If the output enable/disable decision unit 560 decides that output operation is impossible, the process moves on to step S914 to set the currently determined connection scheme as an unavailable connection scheme.

Available Connection Scheme Display Processing

Figure 10:
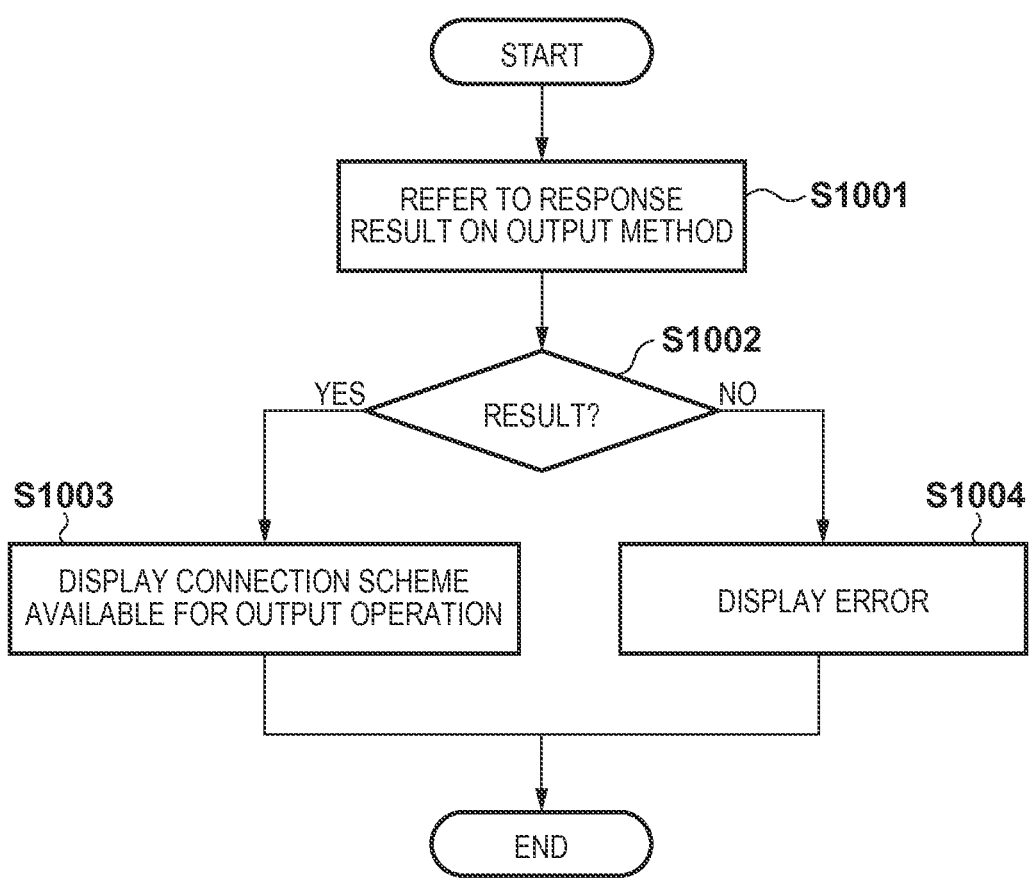
FIG. 10 is a flowchart showing the detailed processing in steps S812 and S816.

Available connection scheme display processing (the details of processing corresponding to steps S812 and S816 in FIG. 8) of the document output software 501 operating on the mobile terminal 103 will be described below with reference to the flowchart shown in FIG. 10. This processing relates to displaying available connection schemes on the mobile terminal window 600 on the touch panel (not shown) of the mobile terminal 103 after the reception of a result from the integrated management server 102 in step S815 in FIG. 8.

Upon receiving a result from the integrated management server 102, the data transmission/reception unit 507 notifies the main control unit 502 of the corresponding information. In step 1001, upon receiving the notification, the main control unit 502 refers to the available connection scheme information received as the result from the integrated management server 102. In this case, the main control unit 502 determines the presence/absence of a determination result (step S1002). If there is no available connection scheme, the process shifts to step S1004, in which the main control unit 502 performs display of an error message on the mobile terminal window 600 by issuing an instruction to the window display unit 503. If there is an available connection scheme, the process shifts to step S1003, in which the main control unit 502 displays the available connection scheme on the mobile terminal window 600 by issuing an instruction to the window display unit 503.

Second Embodiment

The second embodiment of the present invention will be described in detail next with reference to the accompanying drawings. The first embodiment is configured to decide whether or not it is possible to perform an output operation mainly based on the authority of a user, the security attribute of a document, and the position information of the user. However, factors associated with whether an output operation is possible or not may include other factors described below. More particularly, these factors include a case in which the data format of a document to be output does not match the output function of an integrated management server 102, a case in which it is impossible to perform data conversion for output operation and hence to output any information to an image forming apparatus 101, and a case in which, when directly transmitting data to the image forming apparatus 101, a mobile terminal 103 cannot output the data because the image forming apparatus 101 cannot interpret the data format of the document. In such cases, therefore, it is necessary to determine whether or not it is possible to perform an output operation in consideration of the data format of an output target.

Note that the hardware configuration and software configuration in the second embodiment are the same as those in the first embodiment, and hence only differences from the first embodiment will be described below. In addition, although the output method presentation processing shown in FIG. 8 is similar to the second embodiment, the processing in step S813 of FIG. 8 is output enable/disable determination processing performed according to the data format of a document to be output in the second embodiment.

Output Enable/Disable Processing for Each Connection Scheme (Data Format)

The detailed processing in step S813 of FIG. 8 performed for the second embodiment will be described with reference to the flowchart shown in FIG. 11. This processing is the processing of selecting a connection scheme, from the connection schemes available for connection to the image forming apparatus 101 as an output operation target, which is available under the current conditions. Upon receiving a response from a device information management unit 520 in step S808 in FIG. 8, an output enable/disable decision unit 560 executes the processing in steps S1101 to S1117 for each received connection scheme.

First of all, the output enable/disable decision unit 560 decides whether the connection scheme currently determined in step S1102 is an output operation via an output management unit 540 of the integrated management server 102. More specifically, connection schemes are managed upon being mapped to identifiers determined in advance, and the types of connection schemes are decided according to the identifiers. If the output enable/disable decision unit 560 decides in step S1102 that the currently determined connection scheme is an output operation via the output management unit 540, the process shifts to step S1103, in which the output enable/disable decision unit 560 makes an inquiry with the output management unit 540 as to whether or not it is possible to perform an output operation. In this case, the output enable/disable decision unit 560 transmits the attribute information (document information) of the document received in step S802 in FIG. 8.

In response to this inquiry, the output management unit 540 refers to inquiry information including the attribute information of the received document in step S1104. In step S1105, the output management unit 540 determines whether the format of the document to be output allows data conversion for output operation. More specifically, assume that the output management unit 540 manages data formats which allow data conversion for output operation in a table (not shown). This table manages the extensions of data which allow data conversion. In step S1104, the output management unit 540 refers to the attribute information of the document received together with the inquiry, and can decide in step S1105 whether data conversion can be performed, by determining whether the data format is defined in the table. For example, if ".pdf" is designated as the data format of a document in the attribute information of the document and, for example, ".pdf→.ps" or ".pdf→.pcl" are written in the table for data conversion managed by the output management unit, the output management unit 540 decides that data conversion can be performed. In step S1105, the output management unit 540 decides that an output operation is possible if the extension is included in the table, and decides that an output operation is impossible if the extension is not included in the table. In step S1106, the output management unit 540 returns the decision obtained in step S1105, to the output enable/disable decision unit 560.

If the output enable/disable decision unit 560 decides in step S1102 that the currently determined connection scheme does not use the connection via the output management unit 540, the output enable/disable decision unit 560 transfers the identification information of the image forming apparatus 101 to the device information management unit 520. The output enable/disable decision unit 560 then inquires about the data format which the image forming apparatus 101 can accept for output operation (step S1108).

The device information management unit 520 receives the inquiry from the output enable/disable decision unit 560 in step S1109. The device information management unit 520 searches for the device information of a corresponding device in step S1110 based on the identification information of a device which is received together with the inquiry, and refers to a data format which the device can accept for an output operation from the device information. This processing is the processing of referring to a data format of the device information managed by the device information management unit 520 which matches the identification information, as shown FIGS. 7A to 7G ("corresponding data format" shown in FIG. 7A). The device information management unit 520 then returns the data format acquired in step S1110, which the image forming apparatus 101 can accept for output operation, to the output enable/disable decision unit 560 in step S1111. If, for example, the identification information of the device to be determined is "device0001", "PDL" and "PDF" are returned as corresponding data formats in step S1111.

The output enable/disable decision unit 560 receives the data formats which the image forming apparatus 101 can accept for output operation from the device information management unit 520 in step S1112. In step S1113, the output enable/disable decision unit 560 decides whether the data format of the attribute information of the attribute information of the document received together with the inquiry in step S802 is included in the data formats received in step S1112 which the image forming apparatus 101 can accept for an output operation. If the data format is included, the output enable/disable decision unit 560 decides that an output operation is possible. If the data format is not included, the output enable/disable decision unit 560 decides that an output operation is impossible. The output enable/disable decision unit 560 then determines whether or not it is possible to perform an output operation based on the determination result in step S1113 or S1107 (step S1114). Upon determining that an output operation is possible, the output enable/disable decision unit 560 sets the currently determined connection scheme as an available connection scheme in step S1115. Upon determining that an output operation is impossible, the output enable/disable decision unit 560 sets the currently determined connection scheme as an unavailable connection scheme in step S1116. Upon completing the processing in steps S1101 to S1117 for each connection scheme, the output enable/disable decision unit 560 returns the result to the mobile terminal 103 in the processing in step S814 shown in FIG. 8.

According to this embodiment, when displaying connection schemes available for the image forming apparatus designated by the user of the mobile terminal 103, the mobile terminal 103 presents the connection schemes in consideration of the data format of a document. This makes it possible to solve the problem that even when a user transmits a document to an image forming apparatus, the apparatus does not execute output processing for the document.

Third Embodiment

The third embodiment of the present invention will be described in detail next with reference to the accompanying drawings. The first and second embodiments are configured to decide whether or not it is possible to perform an output operation in accordance with factors in terms of authority or the data formats of output documents. Conditions for determining whether or not it is possible to perform an output operation may change in accordance with the area in which a document to be output is stored. The third embodiment may perform multiple determinations including the decision made in the second embodiment.

Note that the hardware configuration and software configuration in the third embodiment are the same as those in the first embodiment, and hence only differences from the first embodiment will be described below. Although the output method presentation processing shown in FIG. 8 is similar to that of the first embodiment, the processing in step S813 of FIG. 8 in the third embodiment is output enable/disable determination processing in which it is determined whether or not an output operation is possible in accordance with the storage destination of data in addition to output enable/disable determination in accordance with the data format of data to be output. In addition, assume that when transmitting a request to acquire an available output method to an integrated management server 102 in the output method presentation processing in step S801 in FIG. 8, a mobile terminal 103 transmits a flag indicating whether to upload a document to be output, in addition to the attribute information of the document. This flag indicates whether to output a document existing on the mobile terminal to the integrated management server 102 by data transmission.

Output Enable/Disable Processing for Each
Connection Scheme (Data Format and Data Storage
Location)

Figure 12A:
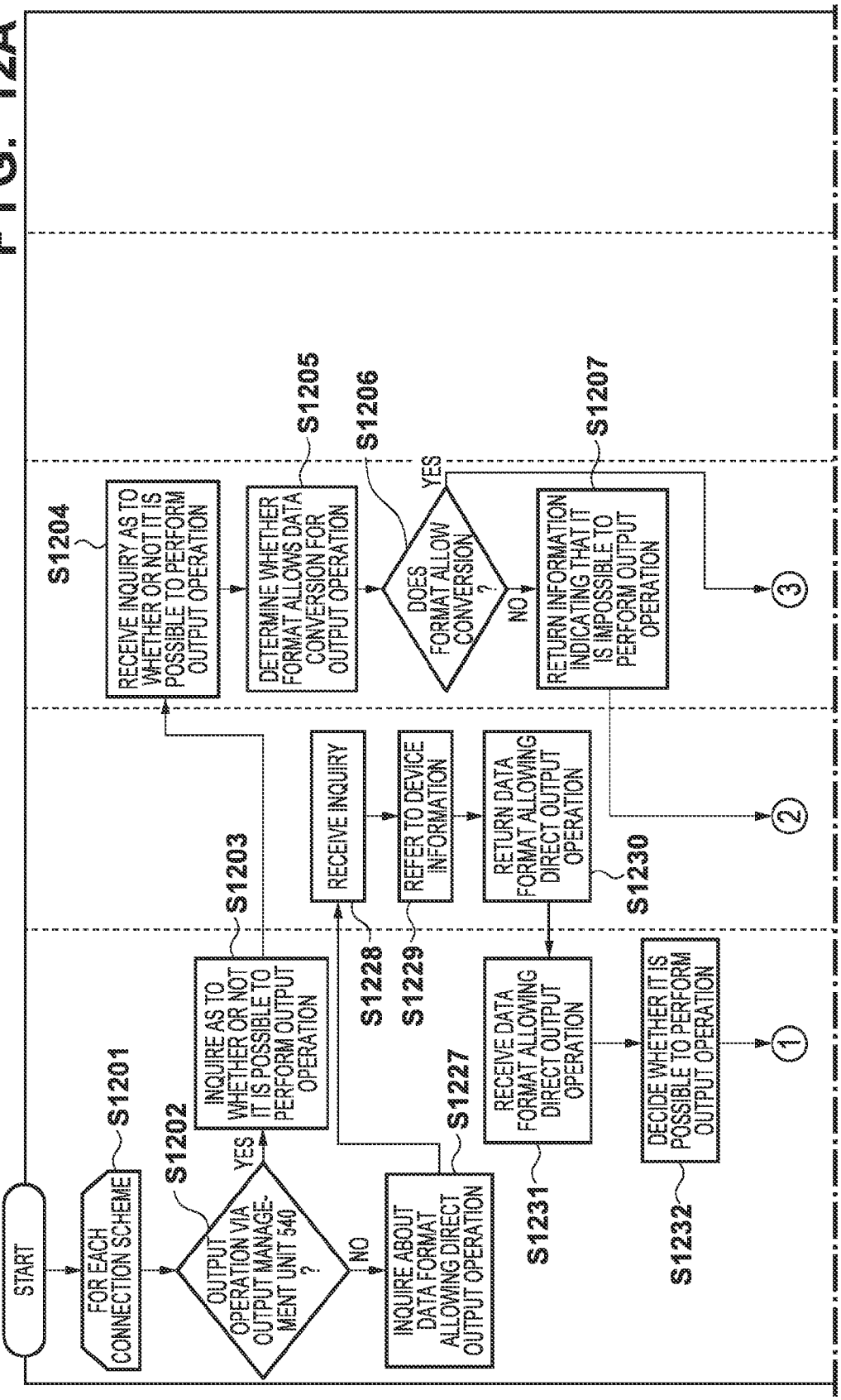

The detailed processing in step S813 of FIG. 8 for the third embodiment will be described with reference to the flowcharts shown in FIGS. 12A to 12C. This is the processing of selecting a connection scheme, from the connection schemes available for connection to an image forming apparatus available for output operation under the current conditions 101 as an output target. Upon receiving a response from a device information management unit 520 in step S808 in FIG. 8, an output enable/disable decision unit 560 executes the processing in steps S1201 to S1244 for each received connection scheme.

First of all, the output enable/disable decision unit 560 decides whether the connection scheme currently determined in step S1202 is an output operation via an output management unit 540 of the integrated management server 102, by the same method as that described in the second embodiment. In this case, if the output enable/disable decision unit 560 decides that the currently determined connection scheme is an output operation via the output management unit 540, the process shifts to step S1203 to inquire with the output management unit 540 about an output enable/disable state. In this case, the output enable/disable decision unit 560 transmits the attribute information of the document received in step S802 in FIG. 8.

Meanwhile, the output management unit 540 refers to the inquiry information including the attribute information of the received document in step S1204. The output management unit 540 then determines in step S1205 whether the format of the document to be output allows data conversion for an output operation, by the same method as that in the second embodiment. If the output management unit 540 decides at step 1206 that it is impossible to perform data conversion and output the document from the output management unit 540, then in step 1207 the output management unit 540 returns information indicating an output disable state as a response to the inquiry of step S1203 from the output enable/disable decision unit 560. In addition, if the output management unit 540 decides in step S1206 that the format of the document is a data format which allows conversion, the process shifts to step S1208. In the processing in step S1208, the output management unit 540 decides whether it is necessary to acquire document data. More specifically, the output management unit 540 refers to a flag of the attribute information of the document, received together with the inquiry in step S802, and a flag indicating whether the mobile terminal 103 uploads the document, which indicates whether to upload the document. If no document is uploaded, the output management unit 540 returns a response to the inquiry of step S1203 from the output enable/disable decision unit 560 as information indicating that output operation can be performed (i.e. uploading is needed) in the processing in step S1209. The information indicating that an output operation can be performed (uploading is necessary) indicates a result indicating that the output operation can be performed under the condition that the mobile terminal 103 uploads document data to the integrated management server 102.

If the determination result in step S1208 indicates that no document is uploaded, the output management unit 540 needs to acquire data. In this case, the process shifts to step S1210, in which the output management unit 540 refers to the storage location information of the document and the attribute information of the document received together with the inquiry in step S1204, and inquires with the document management unit 530 about not only the storage location of the document but also about information indicating whether data can be acquired.

Upon receiving the inquiry in step S1211, the document management unit 530 refers to the inquiry information. In step S1212, the document management unit 530 then decides the type of storage area of the document data in the processing. Examples of the types of document storage areas are data storage areas provided by Google Docs® and Share Point Online® mentioned in the above description. The details of the decision processing in step S1212 for deciding this difference will now be described. The storage location of a document is generally expressed by a URL (Uniform Resource Locator) or the like. Assume that the document management unit 530 manages storage areas linked to hosts in URLs (for example, "aaa.com" in http://aaa.com/bbb/ccc) while associating them in the manner as in the table shown in FIG. 7G. Assume that this table defines location areas which can be linked to the integrated management server 102.

The document management unit 530 extracts a host portion from storage location information and searches the table for the type of storage area matching the host portion, thereby performing discrimination (step S1213). In this case, upon deciding that the storage destination of the document data received as an inquiry is not a storage area which can be linked to the integrated management server 102, in step S1214 the document management unit 530 returns a result indicating that data cannot be acquired, as a response to the inquiry from the output management unit 540. In contrast to this, if the document management unit 530 determines in step S1213 that the storage destination of the document data is a storage area which can be linked to the integrated management server 102, the process shifts to step S1215. In order to determine whether it is possible to access the data, the document management unit 530 issues a request to a user information management unit 550 in step S1215 to acquire the authentication information of the user corresponding to the storage area. In this case, the authentication information to be acquired indicates log-in information generally used to access a storage area and acquire or register a document. This information may be that depending on the provider of the storage area or information like Open ID which can be commonly used regardless of the provider.

Upon receiving an authentication information acquisition request from the document management unit 530 in step S1216, the user information management unit 550 refers to authentication information corresponding to the storage area to be acquired by the user from the user information managed by the user information management unit 550. The user information management unit 550 manages each type of storage area and authentication information corresponding to each image forming apparatus as in the table shown in FIGS. 7D and 7E, and searches the table in FIG. 7D for user information matching the user identifier of user information received together with the inquiry in step S1216. In addition, the user information management unit 550 searches the user information for authentication information corresponding to the storage area to be acquired, and refers to the authentication information. A search key indicating the storage area is a storage area identifier ("storage ID" in FIG. 7D) commonly defined in the integrated management server 102, and the user information management unit 550 searches for matching authentication information based on the identifier. In step S1218, the user information management unit 550 returns the acquisition result on the authentication information to the document management unit 530. In this case, if authentication information can be acquired, the acquired authentication information is returned as a result. If no authentication information can be obtained, "nothing" is returned as a result.

Upon receiving the result from the user information management unit 550, in step S1219 the document management unit 530 attempts to access the storage location of the document in the storage area by using the acquired authentication information. The processing in this case indicates the processing of checking the presence of the document by using a linkage IF or the processing of checking whether it is possible to access the documents to, for example, acquire part of the attribute information of the document. The document management unit 530 then returns to the processing in step S1220 to decide that it is not possible to access the storage location, if the result obtained in step S1219 indicates that it is not possible to access the storage location or if the user information management unit 550 returns, in step S1218, an authentication information acquisition result indicating that no authentication individual image file could be acquired. The process then shifts to step S1221. In step S1221, the document management unit 530 returns information indicating that it is impossible to acquire data, as a response to an inquiry about whether it is possible to acquire data from the output management unit 540. Upon successfully accessing the storage location and deciding that it is possible to access the data in step S1220, in step S1222 the document management unit 530 returns information indicating that it is possible to acquire the data, as a result to the inquiry from the output management unit 540 about whether it is possible to acquire the data.

In this case, the output management unit 540 receives the response to the inquiry in step S1223, and refers to the result. Subsequently, if the output management unit 540 decides from the reference result in step S1224 that it is possible to acquire data, the output management unit 540 causes the output enable/disable decision unit 560 to return, in step S1226, information indicating that it is possible to output, as an output enable/disable response. Upon deciding in step S1225 that it is impossible to acquire data, the output management unit 540 returns, to the output enable/disable decision unit 560, information indicating that it is possible to perform an output operation (uploading is needed).

Upon receiving the response to the inquiry as to whether or not an output operation is possible with respect to the output management unit 540 in step S1238, the output enable/disable decision unit 560 refers to the result. If the result in step S1239 indicates that it is possible to perform output operation, the process shifts to step S1241 to decide whether the result in step S1238 indicates that uploading is needed. If uploading is not needed, it is possible to shorten the process as compared with a case in which a document is uploaded to the integrated management server 102. For this reason, in step S1242, the output management unit 540 finally sets the currently determined connection scheme as an available and recommended scheme. In contrast to this, upon deciding in step S1241 that uploading is needed, in step S1243 the output management unit 540 finally sets the currently determined connection scheme as an available scheme that needs uploading. If the result in step S1239 indicates that it is impossible to perform the output operation, the output management unit 540 finally sets the currently determined connection scheme as an unavailable scheme in step S1240.

The description made so far has described the processing using the output management unit 540. Processing performed without the output management unit 540 will be described next. Upon deciding in step S1202 that the currently determined connection scheme is not an output operation via the output management unit 540, the output enable/disable decision unit 560 transfers the identification information of the image forming apparatus 101 to the device information management unit 520. The output enable/disable decision unit 560 then makes an inquiry about a data format which the image forming apparatus 101 can accept for output operation (step S1227).

The device information management unit 520 receives an inquiry from the output enable/disable decision unit 560 in step S1228. Based on the identification information of a device received together with the inquiry, the device information management unit 520 searches for the device information of the corresponding device and refers to a data format which the device can accept for output operation in step S1229 by the same method as that described in connection with the second embodiment. The device information management unit 520 returns the data format which the image forming apparatus 101 can accept for an output operation, which is acquired in step S1229, to the output enable/disable decision unit 560 in step S1230.

The output enable/disable decision unit 560 receives the data format which the image forming apparatus 101 can accept for an output operation from the device information management unit 520 in step S1231. The output enable/disable decision unit 560 then decides in step S1232 whether the data format, of the attribute information of the document received together with the inquiry in step S802 is included in the data formats which the image forming apparatus 101 can accept for an output operation, which were received in step S1231. If the data format is included, the output enable/disable decision unit 560 decides that an output operation is possible. If the data format is not included, the output enable/disable decision unit 560 decides that an output operation is impossible. The output enable/disable decision unit 560 then in step S1233 decides the determination result based on a determination result obtained in step S1232. Upon determining an output enable state, the output enable/disable decision unit 560 refers to the flag indicating the execution/non-execution of uploading of the document received by the mobile terminal 103 in the processing in step S1235. If the flag indicates the execution of uploading, the output enable/disable decision unit 560 finally sets the currently determined connection scheme as an available recommended scheme in step S1236. That is, in this case, document data on the mobile terminal is output, and it is possible to shorten the process of downloading output data. If, however, the flag indicates the non-execution of uploading (that is, document data other than that on the mobile terminal is output), in step S1237 the output enable/disable decision unit 560 finally sets the currently determined connection scheme as an available scheme needing downloading. Upon deciding in step S1233 that it is impossible to perform an output operation, the output enable/disable decision unit 560 finally sets the currently determined connection scheme as an unavailable scheme in step S1234.

Upon completing the processing in steps S1201 to S1244 for each connection scheme, the output enable/disable decision unit 560 returns the result obtained in step S814 in FIG. 8 to the mobile terminal 103.

Available Connection Scheme Display Processing

Available connection scheme display processing by a document output software 501 operating on the mobile terminal 103 in the third embodiment will be described next with reference to the flowchart shown in FIG. 13. This flowchart shows the details of the processing in step S816 of FIG. 8 for the third embodiment. This processing is the processing of receiving a result from the integrated management server 102 in step S815 in FIG. 8 and then displaying available connection schemes on a mobile terminal window 600 on the touch panel (not shown) of the mobile terminal 103.

Upon receiving a result from the integrated management server 102, a data transmission/reception 507 notifies a main control unit 502 of the corresponding information. Upon receiving the notification, the main control unit 502 refers to the information of available connection schemes received as the result from the integrated management server 102 in step S1301. If the main control unit 502 determines in step S1302 that the received determination result indicates that there is no available connection scheme, the main control unit 502 issues an instruction to a window display unit 503 to display and error message on the mobile terminal window 600 in step S1303, and terminates the processing. If there is any available connection scheme, the main control unit 502 performs the processing in steps S1304 to S1310 for each connection scheme.

First of all, in step S1305, the main control unit 502 decides, by referring to the result information from the integrated management server 102, whether the currently determined connection scheme is a recommended connection scheme. Upon deciding that the connection scheme is a recommended connection scheme, in step S1306 the main control unit 502 sets it as a connection scheme to be preferentially displayed. Upon deciding in step S1305 that the connection scheme is not a recommended connection scheme, the main control unit 502 decides, by referring to the result information from the integrated management server 102, in step S1307 whether the connection scheme is a conditional connection scheme. Upon deciding that the connection scheme is a conditional scheme, the main control unit 502 sets, in step S1309, the currently determined connection scheme as a connection scheme to be displayed as a conditional scheme. Upon determining that the connection scheme is not a conditional scheme, in step S1308 the main control unit 502 sets the connection scheme as a normal (neither recommended nor conditional) connection scheme.

Upon completing the processing in steps S1304 to S1311 for all the connection schemes received as results from the integrated management server 102, the main control unit 502 issues an instruction to the window display unit 503 to display available connection schemes on the mobile terminal window 600. In this case, the connection scheme set as a scheme to be preferentially displayed in the processing in steps S1304 to S1310 is displayed as a recommended scheme. In addition, a connection scheme set as a conditional scheme is displayed as a conditional connection scheme. The details of this operation will be described with reference to the window example shown in FIG. 14.

Software Window Example (Mobile Terminal)

Figure 14:
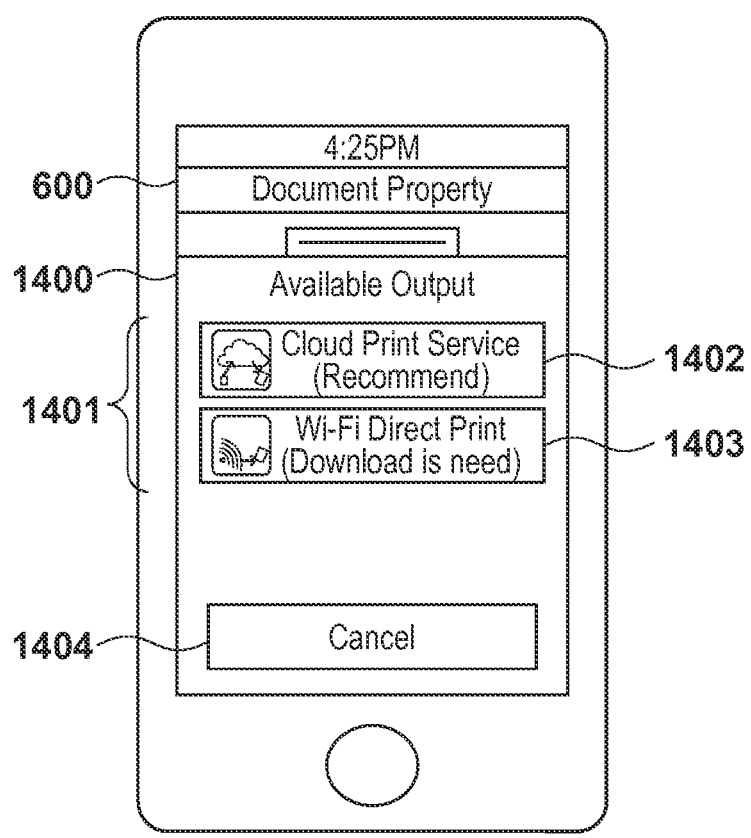
FIG. 14 is a view showing a window example of document output software 501.

FIG. 14 shows a window example of the document output software 501 operating on the mobile terminal 103. This window example is equivalent to an available output method display window 640 shown in FIG. 6 except that preferential display operation in the third embodiment is taken into consideration.

An available output method display window 1400 displays connection schemes available for output operation by a designated image forming apparatus. The available output method display window 1400 displays the output buttons 642 shown in FIG. 6, which designate connection schemes to be used for output operation, in the form of a list, on an available output method list 1401. Note that the available output method display window 1400 displays a connection scheme decided as a recommended scheme in the processing shown in FIG. 13 as an output button 1402 for a recommended scheme and a connection scheme determined as a conditional scheme as an output button 1403 for a conditional scheme. When the user taps the output button 642, a designated document is output to the image forming apparatus by the output method corresponding to the tapped output button. This allows the user to easily select a recommended method from a plurality of available methods.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to the above described embodiments, it is to be understood that the invention is not limited to these embodiments. The scope of the following claims is to be accorded the broadest interpretation so as to encompass all such modifications and equivalent structures and functions.

This application claims the benefit of Japanese Patent Application No. 2011-191081, filed Sep. 1, 2011, which is hereby incorporated by reference herein in its entirety.

What is claimed is:

1. An information processing apparatus comprising:
a reception unit configured to receive attribute information of a document designated by a user of a terminal apparatus and information concerning an image forming apparatus designated by the user of the terminal apparatus;
a selection unit configured to select a connection scheme, from a plurality of connection schemes between the designated image forming apparatus and the terminal apparatus, that allows the image forming apparatus to process the designated document, based on the attribute information of the document received by the reception unit; and
a transmission unit configured to transmit the connection scheme selected by the selection unit to the terminal apparatus.

2. The apparatus according to claim 1, wherein the terminal apparatus is configured to display the connection scheme transmitted by the transmission unit.

3. The apparatus according to claim 1, wherein the reception unit is further configured to receive position information of the terminal apparatus and identification information of the user, and
the selection unit is configured to select the connection route based on the position information of the terminal apparatus, the attribute information of the document and the identification information of the user.

4. The apparatus according to claim 1, further comprising a determination unit configured to determine whether each connection scheme can convert a data format of the designated document into a data format compatible with the image forming apparatus, wherein the selection unit is configured to execute selection processing so as to select a connection scheme determined by the determination unit as a connection scheme configured to convert the data format of the designated document into a data format compatible with the image forming apparatus and not to select a connection scheme determined by the determination unit as a connection scheme which is not configured to convert the data format of the designated document into a data format compatible with the image forming apparatus.

5. A method for an information processing apparatus, the method comprising:

receiving attribute information of a document designated by a user of a terminal apparatus and information concerning an image forming apparatus designated by the user of the terminal apparatus;

selecting a connection scheme, from a plurality of connection schemes between the designated image forming apparatus and the terminal apparatus, which allows the image forming apparatus to process the designated document, based on the attribute information of the document received in the reception step; and transmitting the connection scheme selected in the selecting to the terminal apparatus.

6. The method according to claim 5, wherein the terminal apparatus is configured to display the connection scheme transmitted in the transmitting.

7. The method according to claim 5, wherein in the step of receiving, position information of the terminal apparatus and identification information of the user are further received, and in the step of selecting, the connection route is selected based on the position information of the terminal apparatus, the attribute information of the document and the identification information of the user.

8. The method according to claim 5, further comprising determining whether each connection scheme can convert a data format of the designated document into a data format compatible with the image forming apparatus, wherein in the step of selecting, selection processing is executed so as to select a connection scheme determined in the step of determining as a connection scheme configured to convert the data format of the designated document into a data format compatible with the image forming apparatus and not to select a connection scheme determined in the step of determining as a connection scheme which is not configured to convert the data format of the designated document into a data format compatible with the image forming apparatus.

9. A non-transitory computer-readable recording medium recording a program for causing a computer to execute a processing method according to claim 5 for an information processing apparatus.

* * * * *